(12) United States Patent
Chang et al.

(10) Patent No.: US 8,804,056 B2
(45) Date of Patent: Aug. 12, 2014

(54) INTEGRATED TOUCH SCREENS

(75) Inventors: Shih Chang Chang, San Jose, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/976,997

(22) Filed: Dec. 22, 2010

(65) Prior Publication Data

US 2012/0162584 A1 Jun. 28, 2012

(51) Int. Cl.
*G02F 1/1335* (2006.01)
*G06F 3/044* (2006.01)
*G06F 3/041* (2006.01)

(52) U.S. Cl.
CPC ............. *G06F 3/0412* (2013.01); *G06F 3/044* (2013.01)
USPC ............................................ 349/12; 345/174

(58) Field of Classification Search
CPC .............................. G06F 3/044; G02F 1/13338
USPC ............................................ 349/12; 345/147
See application file for complete search history.

(56) References Cited

U.S. PATENT DOCUMENTS

| | | |
|---|---|---|
| 2,751,555 A | 6/1956 | Kirkpatrick |
| 3,333,160 A | 7/1967 | Gorski |
| 3,541,541 A | 11/1970 | Englebart |
| 3,644,835 A | 2/1972 | Thompson |
| 3,662,105 A | 5/1972 | Hurst et al. |
| 3,798,370 A | 3/1974 | Hurst |
| 3,974,332 A | 8/1976 | Abe et al. |
| 4,194,083 A | 3/1980 | Abe et al. |
| 4,233,522 A | 11/1980 | Grummer et al. |
| 4,246,452 A | 1/1981 | Chandler |
| 4,250,495 A | 2/1981 | Beckerman et al. |
| 4,266,144 A | 5/1981 | Bristol |
| 4,268,815 A | 5/1981 | Eventoff et al. |
| 4,277,517 A | 7/1981 | Smith, Jr. |
| 4,290,052 A | 9/1981 | Eichelberger et al. |
| 4,307,383 A | 12/1981 | Brienza |

(Continued)

FOREIGN PATENT DOCUMENTS

| | | |
|---|---|---|
| AU | 2005246219 A1 | 12/2005 |
| CA | 1243096 A | 10/1988 |

(Continued)

OTHER PUBLICATIONS

Non-Final Office Action mailed Feb. 17, 2012, for U.S. Appl. No. 13/251,099, filed Sep. 30, 2011, seven pages.

(Continued)

*Primary Examiner* — Phu Vu
(74) *Attorney, Agent, or Firm* — Morrision & Foerster LLP

(57) ABSTRACT

Integrated touch screens are provided including drive lines formed of grouped-together circuit elements of a thin film transistor layer and sense lines formed between a color filter layer and a material layer that modifies or generates light. The common electrodes (Vcom) in the TFT layer can be grouped together during a touch sensing operation to form drive lines. Sense lines can be formed on an underside of a color filter glass, and a liquid crystal region can be disposed between the color filter glass and the TFT layer. Placing the sense lines on the underside of the color filter glass, i.e., within the display pixel cell, can provide a benefit of allowing the color filter glass to be thinned after the pixel cells have been assembled, for example.

10 Claims, 16 Drawing Sheets

(56) References Cited

U.S. PATENT DOCUMENTS

| | | |
|---|---|---|
| 4,313,108 A | 1/1982 | Yoshida |
| 4,345,000 A | 8/1982 | Kawazoe et al. |
| 4,363,027 A | 12/1982 | Brienza |
| 4,394,643 A | 7/1983 | Williams |
| 4,526,043 A | 7/1985 | Boie |
| 4,550,221 A | 10/1985 | Mabusth |
| 4,587,378 A | 5/1986 | Moore |
| 4,618,989 A | 10/1986 | Tsukune et al. |
| 4,623,757 A | 11/1986 | Marino |
| 4,639,720 A | 1/1987 | Rympalski et al. |
| 4,672,364 A | 6/1987 | Lucas |
| 4,672,558 A | 6/1987 | Beckes et al. |
| 4,686,332 A | 8/1987 | Greanias et al. |
| 4,692,809 A | 9/1987 | Beining et al. |
| 4,695,827 A | 9/1987 | Beining et al. |
| 4,707,845 A | 11/1987 | Krein et al. |
| 4,723,056 A | 2/1988 | Tamaru et al. |
| 4,733,222 A | 3/1988 | Evans |
| 4,734,685 A | 3/1988 | Watanabe |
| 4,740,781 A | 4/1988 | Brown |
| 4,746,770 A | 5/1988 | McAvinney |
| 4,771,276 A | 9/1988 | Parks |
| 4,772,885 A | 9/1988 | Uehara et al. |
| 4,788,384 A | 11/1988 | Bruere-Dawson et al. |
| 4,806,709 A | 2/1989 | Evans |
| 4,806,846 A | 2/1989 | Kerber |
| 4,853,493 A | 8/1989 | Schlosser et al. |
| 4,898,555 A | 2/1990 | Sampson |
| 4,910,504 A | 3/1990 | Eriksson |
| 4,914,624 A | 4/1990 | Dunthorn et al. |
| 4,916,308 A | 4/1990 | Meadows |
| 4,954,823 A | 9/1990 | Binstead |
| 4,968,877 A | 11/1990 | McAvinney et al. |
| 5,003,519 A | 3/1991 | Noirjean |
| 5,017,030 A | 5/1991 | Crews |
| 5,062,198 A | 11/1991 | Sun |
| 5,073,950 A | 12/1991 | Colbert et al. |
| 5,105,186 A | 4/1992 | May |
| 5,105,288 A | 4/1992 | Senda et al. |
| 5,113,041 A | 5/1992 | Blonder et al. |
| 5,117,071 A | 5/1992 | Greanias et al. |
| 5,178,477 A | 1/1993 | Gambaro |
| 5,189,403 A | 2/1993 | Franz et al. |
| 5,194,862 A | 3/1993 | Edwards |
| 5,224,861 A | 7/1993 | Glass et al. |
| 5,239,152 A | 8/1993 | Caldwell et al. |
| 5,241,308 A | 8/1993 | Young |
| 5,252,951 A | 10/1993 | Tannenbaum et al. |
| 5,281,966 A | 1/1994 | Walsh |
| 5,293,430 A | 3/1994 | Shiau et al. |
| 5,305,017 A | 4/1994 | Gerpheide |
| 5,345,543 A | 9/1994 | Capps et al. |
| 5,353,135 A | 10/1994 | Edwards |
| 5,374,787 A | 12/1994 | Miller et al. |
| 5,376,948 A | 12/1994 | Roberts |
| 5,381,160 A | 1/1995 | Landmeier |
| 5,386,219 A | 1/1995 | Greanias et al. |
| 5,392,058 A | 2/1995 | Tagawa |
| 5,398,310 A | 3/1995 | Tchao et al. |
| 5,432,671 A | 7/1995 | Allavena |
| 5,442,742 A | 8/1995 | Greyson et al. |
| 5,457,289 A | 10/1995 | Huang et al. |
| 5,459,463 A | 10/1995 | Gruaz et al. |
| 5,463,388 A | 10/1995 | Boie et al. |
| 5,463,696 A | 10/1995 | Beernink et al. |
| 5,483,261 A | 1/1996 | Yasutake |
| 5,488,204 A | 1/1996 | Mead et al. |
| 5,495,077 A | 2/1996 | Miller et al. |
| 5,499,026 A | 3/1996 | Liao et al. |
| 5,513,309 A | 4/1996 | Meier et al. |
| 5,523,775 A | 6/1996 | Capps |
| 5,530,455 A | 6/1996 | Gillick et al. |
| 5,534,892 A | 7/1996 | Tagawa |
| 5,543,588 A | 8/1996 | Bisset et al. |
| 5,543,589 A | 8/1996 | Buchana et al. |
| 5,543,590 A | 8/1996 | Gillespie et al. |
| 5,543,591 A | 8/1996 | Gillespie et al. |
| 5,550,659 A | 8/1996 | Fujieda et al. |
| 5,552,787 A | 9/1996 | Schuler et al. |
| 5,563,632 A | 10/1996 | Roberts |
| 5,563,727 A | 10/1996 | Larson et al. |
| 5,563,996 A | 10/1996 | Tchao |
| 5,565,658 A | 10/1996 | Gerpheide et al. |
| 5,572,205 A | 11/1996 | Caldwell et al. |
| 5,576,070 A | 11/1996 | Yaniv |
| 5,579,036 A | 11/1996 | Yates, IV |
| 5,581,681 A | 12/1996 | Tchao et al. |
| 5,583,946 A | 12/1996 | Gourdol |
| 5,589,856 A | 12/1996 | Stein et al. |
| 5,590,219 A | 12/1996 | Gourdol |
| 5,592,566 A | 1/1997 | Pagallo et al. |
| 5,594,806 A | 1/1997 | Colbert |
| 5,594,810 A | 1/1997 | Gourdol |
| 5,596,694 A | 1/1997 | Capps |
| 5,612,719 A | 3/1997 | Beernink et al. |
| 5,623,280 A | 4/1997 | Akins et al. |
| 5,631,805 A | 5/1997 | Bonsall |
| 5,633,955 A | 5/1997 | Bozinovic et al. |
| 5,634,102 A | 5/1997 | Capps |
| 5,636,101 A | 6/1997 | Bonsall et al. |
| 5,638,093 A | 6/1997 | Takahashi et al. |
| 5,642,108 A | 6/1997 | Gopher et al. |
| 5,644,657 A | 7/1997 | Capps et al. |
| 5,648,642 A | 7/1997 | Miller et al. |
| 5,650,597 A | 7/1997 | Redmayne |
| 5,666,113 A | 9/1997 | Logan |
| 5,666,502 A | 9/1997 | Capps |
| 5,666,552 A | 9/1997 | Greyson et al. |
| 5,675,361 A | 10/1997 | Santilli |
| 5,677,710 A | 10/1997 | Thompson-Rohrlich |
| 5,677,744 A | 10/1997 | Yoneda et al. |
| 5,686,973 A | 11/1997 | Lee |
| 5,689,253 A | 11/1997 | Hargreaves et al. |
| 5,710,844 A | 1/1998 | Capps et al. |
| 5,729,250 A | 3/1998 | Bishop et al. |
| 5,730,165 A | 3/1998 | Philipp |
| 5,734,742 A | 3/1998 | Asaeda et al. |
| 5,734,751 A | 3/1998 | Saito |
| 5,736,976 A | 4/1998 | Cheung |
| 5,741,990 A | 4/1998 | Davies |
| 5,745,116 A | 4/1998 | Pisutha-Arnond |
| 5,745,716 A | 4/1998 | Tchao et al. |
| 5,748,269 A | 5/1998 | Harris et al. |
| 5,764,218 A | 6/1998 | Bona et al. |
| 5,764,818 A | 6/1998 | Capps et al. |
| 5,767,457 A | 6/1998 | Gerpheide et al. |
| 5,767,842 A | 6/1998 | Korth |
| 5,777,596 A | 7/1998 | Herbert |
| 5,790,104 A | 8/1998 | Shieh |
| 5,790,106 A | 8/1998 | Hirano et al. |
| 5,790,107 A | 8/1998 | Kasser et al. |
| 5,802,516 A | 9/1998 | Shwarts et al. |
| 5,805,144 A | 9/1998 | Scholder et al. |
| 5,808,567 A | 9/1998 | McCloud |
| 5,809,166 A | 9/1998 | Huang et al. |
| 5,809,267 A | 9/1998 | Moran et al. |
| 5,815,141 A | 9/1998 | Phares |
| 5,821,690 A | 10/1998 | Martens et al. |
| 5,821,930 A | 10/1998 | Hansen |
| 5,823,782 A | 10/1998 | Marcus et al. |
| 5,825,351 A | 10/1998 | Tam |
| 5,825,352 A | 10/1998 | Bisset et al. |
| 5,835,079 A | 11/1998 | Shieh |
| 5,838,308 A | 11/1998 | Knapp et al. |
| 5,841,078 A | 11/1998 | Miller et al. |
| 5,841,415 A | 11/1998 | Kwon et al. |
| 5,844,506 A | 12/1998 | Binstead |
| 5,847,690 A | 12/1998 | Boie et al. |
| 5,852,487 A | 12/1998 | Fujimori et al. |
| 5,854,450 A | 12/1998 | Kent |
| 5,854,625 A | 12/1998 | Frisch et al. |
| 5,856,822 A | 1/1999 | Du et al. |
| 5,861,583 A | 1/1999 | Schediwy et al. |
| 5,861,875 A | 1/1999 | Gerpheide |

(56) References Cited

U.S. PATENT DOCUMENTS

| | | |
|---|---|---|
| 5,867,151 A | 2/1999 | Nakai |
| 5,869,790 A | 2/1999 | Shigetaka et al. |
| 5,869,791 A | 2/1999 | Young |
| 5,880,411 A | 3/1999 | Gillespie et al. |
| 5,898,434 A | 4/1999 | Small et al. |
| 5,914,465 A | 6/1999 | Allen et al. |
| 5,917,165 A | 6/1999 | Platt et al. |
| 5,920,298 A | 7/1999 | McKnight |
| 5,920,309 A | 7/1999 | Bisset et al. |
| 5,923,319 A | 7/1999 | Bishop et al. |
| 5,929,834 A | 7/1999 | Inoue et al. |
| 5,933,134 A | 8/1999 | Shieh |
| 5,940,055 A | 8/1999 | Lee |
| 5,940,064 A | 8/1999 | Kai et al. |
| 5,942,733 A | 8/1999 | Allen et al. |
| 5,943,043 A | 8/1999 | Furuhata et al. |
| 5,943,044 A | 8/1999 | Martinelli et al. |
| 5,945,980 A | 8/1999 | Moissev et al. |
| 5,952,998 A | 9/1999 | Clancy et al. |
| 5,955,198 A | 9/1999 | Hashimoto et al. |
| 5,982,352 A | 11/1999 | Pryor |
| 5,986,723 A | 11/1999 | Nakamura et al. |
| 6,002,389 A | 12/1999 | Kasser |
| 6,002,808 A | 12/1999 | Freeman |
| 6,008,800 A | 12/1999 | Pryor |
| 6,020,881 A | 2/2000 | Naughton et al. |
| 6,020,945 A | 2/2000 | Sawai et al. |
| 6,023,265 A | 2/2000 | Lee |
| 6,028,581 A | 2/2000 | Umeya |
| 6,029,214 A | 2/2000 | Dorfman et al. |
| 6,031,524 A | 2/2000 | Kunert |
| 6,037,882 A | 3/2000 | Levy |
| 6,050,825 A | 4/2000 | Nichol et al. |
| 6,052,339 A | 4/2000 | Frenkel et al. |
| 6,057,903 A | 5/2000 | Colgan et al. |
| 6,061,177 A | 5/2000 | Fujimoto |
| 6,072,494 A | 6/2000 | Nguyen |
| 6,081,259 A | 6/2000 | Teterwak |
| 6,084,576 A | 7/2000 | Leu et al. |
| 6,107,654 A | 8/2000 | Yamazaki |
| 6,107,997 A | 8/2000 | Ure |
| 6,124,848 A | 9/2000 | Ballare et al. |
| 6,128,003 A | 10/2000 | Smith et al. |
| 6,131,299 A | 10/2000 | Raab et al. |
| 6,135,958 A | 10/2000 | Mikula-Curtis et al. |
| 6,137,427 A | 10/2000 | Binstead |
| 6,144,380 A | 11/2000 | Shwarts et al. |
| 6,163,313 A | 12/2000 | Aroyan et al. |
| 6,172,667 B1 | 1/2001 | Sayag |
| 6,177,918 B1 | 1/2001 | Colgan et al. |
| 6,188,391 B1 | 2/2001 | Seely et al. |
| 6,191,828 B1 | 2/2001 | Kim et al. |
| 6,198,515 B1 | 3/2001 | Cole |
| 6,204,897 B1 | 3/2001 | Colgan et al. |
| 6,208,329 B1 | 3/2001 | Ballare |
| 6,211,585 B1 | 4/2001 | Sato et al. |
| 6,222,465 B1 | 4/2001 | Kumar et al. |
| 6,239,389 B1 | 5/2001 | Allen et al. |
| 6,239,788 B1 | 5/2001 | Nohno et al. |
| 6,239,790 B1 | 5/2001 | Martinelli et al. |
| 6,243,071 B1 | 6/2001 | Shwarts et al. |
| 6,246,862 B1 | 6/2001 | Grivas et al. |
| 6,249,606 B1 | 6/2001 | Kiraly et al. |
| 6,259,490 B1 | 7/2001 | Colgan et al. |
| 6,271,835 B1 | 8/2001 | Hoeksma |
| 6,285,428 B1 | 9/2001 | Kim et al. |
| 6,288,707 B1 | 9/2001 | Philipp |
| 6,289,326 B1 | 9/2001 | LaFleur |
| 6,292,178 B1 | 9/2001 | Bernstein et al. |
| 6,297,811 B1 | 10/2001 | Kent |
| 6,310,610 B1 | 10/2001 | Beaton et al. |
| 6,323,846 B1 | 11/2001 | Westerman et al. |
| 6,323,849 B1 | 11/2001 | He et al. |
| 6,337,678 B1 | 1/2002 | Fish |
| 6,342,938 B1 | 1/2002 | Song et al. |
| 6,347,290 B1 | 2/2002 | Bartlett |
| 6,377,009 B1 | 4/2002 | Philipp |
| 6,380,931 B1 | 4/2002 | Gillespie et al. |
| 6,411,287 B1 | 6/2002 | Scharff et al. |
| 6,414,671 B1 | 7/2002 | Gillespie et al. |
| 6,417,846 B1 | 7/2002 | Lee |
| 6,421,039 B1 | 7/2002 | Moon et al. |
| 6,421,234 B1 | 7/2002 | Ricks et al. |
| 6,425,289 B1 | 7/2002 | Igel et al. |
| 6,452,514 B1 | 9/2002 | Philipp |
| 6,457,355 B1 | 10/2002 | Philipp |
| 6,459,424 B1 | 10/2002 | Resman |
| 6,466,036 B1 | 10/2002 | Philipp |
| 6,483,498 B1 | 11/2002 | Colgan et al. |
| 6,501,528 B1 | 12/2002 | Hamada |
| 6,501,529 B1 | 12/2002 | Kurihara et al. |
| 6,504,530 B1 | 1/2003 | Wilson et al. |
| 6,504,713 B1 | 1/2003 | Pandolfi et al. |
| 6,515,669 B1 | 2/2003 | Mohri |
| 6,522,772 B1 | 2/2003 | Morrison et al. |
| 6,525,547 B2 | 2/2003 | Hayes |
| 6,525,749 B1 | 2/2003 | Moran et al. |
| 6,535,200 B2 | 3/2003 | Philipp |
| 6,543,684 B1 | 4/2003 | White et al. |
| 6,543,947 B2 | 4/2003 | Lee |
| 6,549,193 B1 | 4/2003 | Huang et al. |
| 6,570,557 B1 | 5/2003 | Westerman et al. |
| 6,593,916 B1 | 7/2003 | Aroyan |
| 6,602,790 B2 | 8/2003 | Kian et al. |
| 6,610,936 B2 | 8/2003 | Gillespie et al. |
| 6,624,833 B1 | 9/2003 | Kumar et al. |
| 6,624,835 B2 | 9/2003 | Willig |
| 6,628,268 B1 | 9/2003 | Harada et al. |
| 6,639,577 B2 | 10/2003 | Eberhard |
| D482,368 S | 11/2003 | DenToonder et al. |
| 6,650,319 B1 | 11/2003 | Hurst et al. |
| 6,658,994 B1 | 12/2003 | McMillan |
| 6,670,894 B2 | 12/2003 | Mehring |
| 6,677,932 B1 | 1/2004 | Westerman |
| 6,677,934 B1 | 1/2004 | Blanchard |
| 6,680,448 B2 | 1/2004 | Kawashima et al. |
| 6,690,387 B2 | 2/2004 | Zimmerman et al. |
| 6,721,375 B1 | 4/2004 | Hammel |
| 6,723,929 B2 | 4/2004 | Kent |
| 6,724,366 B2 | 4/2004 | Crawford |
| 6,757,002 B1 | 6/2004 | Oross et al. |
| 6,762,752 B2 | 7/2004 | Perski et al. |
| 6,784,948 B2 | 8/2004 | Kawashima et al. |
| 6,785,578 B2 | 8/2004 | Johnson et al. |
| 6,803,906 B1 | 10/2004 | Morrison et al. |
| 6,825,833 B2 | 11/2004 | Mulligan et al. |
| 6,842,672 B1 | 1/2005 | Straub et al. |
| 6,846,579 B2 | 1/2005 | Anderson et al. |
| 6,856,259 B1 | 2/2005 | Sharp |
| 6,876,355 B1 | 4/2005 | Ahn et al. |
| 6,888,536 B2 | 5/2005 | Westerman et al. |
| 6,900,795 B1 | 5/2005 | Knight, III et al. |
| 6,906,692 B2 | 6/2005 | Ishiyama |
| 6,924,789 B2 | 8/2005 | Bick |
| 6,927,761 B2 | 8/2005 | Badaye et al. |
| 6,927,763 B2 | 8/2005 | LaMonica |
| 6,942,571 B1 | 9/2005 | McAllister et al. |
| 6,943,779 B2 | 9/2005 | Satoh |
| 6,961,049 B2 | 11/2005 | Mulligan et al. |
| 6,965,375 B1 | 11/2005 | Gettemy et al. |
| 6,970,160 B2 | 11/2005 | Mulligan et al. |
| 6,972,401 B2 | 12/2005 | Akitt et al. |
| 6,977,666 B1 | 12/2005 | Hedrick |
| 6,982,432 B2 | 1/2006 | Umemoto et al. |
| 6,985,801 B1 | 1/2006 | Straub et al. |
| 6,992,659 B2 | 1/2006 | Gettemy |
| 6,995,752 B2 | 2/2006 | Lu |
| 7,015,894 B2 | 3/2006 | Morohoshi |
| 7,023,427 B2 | 4/2006 | Kraus et al. |
| 7,030,860 B1 | 4/2006 | Hsu et al. |
| 7,031,228 B2 | 4/2006 | Born et al. |
| 7,038,659 B2 | 5/2006 | Rajkowski |
| 7,042,444 B2 | 5/2006 | Cok |
| 7,046,235 B2 | 5/2006 | Katoh |

(56) References Cited

U.S. PATENT DOCUMENTS

| | | |
|---|---|---|
| 7,088,342 B2 | 8/2006 | Rekimoto |
| 7,088,343 B2 | 8/2006 | Smith |
| 7,098,127 B2 | 8/2006 | Ito |
| 7,098,897 B2 | 8/2006 | Vakil et al. |
| 7,109,978 B2 | 9/2006 | Gillespie et al. |
| 7,129,935 B2 | 10/2006 | Mackey |
| 7,133,032 B2 | 11/2006 | Cok |
| 7,138,984 B1 | 11/2006 | Miles |
| 7,151,528 B2 | 12/2006 | Taylor et al. |
| 7,154,481 B2 | 12/2006 | Cross et al. |
| 7,177,001 B2 | 2/2007 | Lee |
| 7,184,064 B2 | 2/2007 | Zimmerman et al. |
| 7,190,416 B2 | 3/2007 | Paukshto et al. |
| 7,202,856 B2 | 4/2007 | Cok |
| 7,230,608 B2 | 6/2007 | Cok |
| 7,254,775 B2 | 8/2007 | Geaghan et al. |
| 7,268,770 B1 | 9/2007 | Takahata et al. |
| 7,274,353 B2 | 9/2007 | Chiu et al. |
| 7,280,167 B2 | 10/2007 | Choi et al. |
| 7,292,229 B2 | 11/2007 | Morag et al. |
| 7,307,231 B2 | 12/2007 | Matsumoto et al. |
| RE40,153 E | 3/2008 | Westerman et al. |
| 7,339,579 B2 | 3/2008 | Richter et al. |
| 7,355,592 B2 | 4/2008 | Hong et al. |
| 7,362,313 B2 | 4/2008 | Geaghan et al. |
| 7,372,455 B2 | 5/2008 | Perski et al. |
| 7,379,054 B2 | 5/2008 | Lee |
| 7,453,444 B2 | 11/2008 | Geaghan |
| 7,463,246 B2 | 12/2008 | Mackey |
| 7,483,016 B1 | 1/2009 | Gettemy et al. |
| 7,554,624 B2 | 6/2009 | Kusuda et al. |
| 7,633,484 B2 | 12/2009 | Ito |
| 7,663,607 B2 | 2/2010 | Hotelling et al. |
| 7,688,315 B1 | 3/2010 | Gettemy et al. |
| 7,705,834 B2 | 4/2010 | Swedin |
| 7,730,401 B2 | 6/2010 | Gillespie et al. |
| 7,746,326 B2 | 6/2010 | Sato |
| 7,755,683 B2 | 7/2010 | Sergio et al. |
| 7,800,589 B2 | 9/2010 | Hurst et al. |
| 7,812,828 B2 | 10/2010 | Westerman et al. |
| 7,843,439 B2 | 11/2010 | Perski et al. |
| 7,920,129 B2 | 4/2011 | Hotelling et al. |
| 8,031,180 B2 | 10/2011 | Miyamoto et al. |
| 8,125,463 B2 | 2/2012 | Hotelling et al. |
| 8,130,209 B2 | 3/2012 | Chang |
| 8,243,027 B2 | 8/2012 | Hotelling et al. |
| 8,259,078 B2 | 9/2012 | Hotelling et al. |
| 8,416,209 B2 | 4/2013 | Hotelling et al. |
| 8,432,371 B2 | 4/2013 | Hotelling et al. |
| 8,479,122 B2 | 7/2013 | Hotelling et al. |
| 8,493,330 B2 | 7/2013 | Krah |
| 8,552,989 B2 | 10/2013 | Hotelling et al. |
| 8,605,051 B2 | 12/2013 | Hotelling et al. |
| 8,654,083 B2 | 2/2014 | Hotelling et al. |
| 2001/0000961 A1 | 5/2001 | Hikida et al. |
| 2001/0020578 A1 | 9/2001 | Baier |
| 2001/0020986 A1 | 9/2001 | Ikeda et al. |
| 2001/0020987 A1 | 9/2001 | Ahn et al. |
| 2002/0015024 A1 | 2/2002 | Westerman et al. |
| 2002/0041356 A1 | 4/2002 | Tanada et al. |
| 2002/0049070 A1 | 4/2002 | Bick |
| 2002/0084922 A1 | 7/2002 | Yagi |
| 2002/0089496 A1 | 7/2002 | Numao |
| 2002/0101410 A1 | 8/2002 | Sakata et al. |
| 2002/0118848 A1 | 8/2002 | Karpenstein |
| 2002/0140649 A1 | 10/2002 | Aoyama et al. |
| 2002/0159015 A1 | 10/2002 | Seo et al. |
| 2002/0167489 A1 | 11/2002 | Davis |
| 2002/0185981 A1 | 12/2002 | Dietz et al. |
| 2002/0185999 A1 | 12/2002 | Tajima et al. |
| 2002/0186210 A1 | 12/2002 | Itoh |
| 2002/0190964 A1 | 12/2002 | Van Berkel |
| 2002/0191029 A1 | 12/2002 | Gillespie et al. |
| 2002/0192445 A1 | 12/2002 | Ezzell et al. |
| 2002/0196237 A1 | 12/2002 | Fernando et al. |
| 2003/0006974 A1 | 1/2003 | Clough et al. |
| 2003/0035479 A1 | 2/2003 | Kan et al. |
| 2003/0067451 A1 | 4/2003 | Tagg et al. |
| 2003/0069653 A1 | 4/2003 | Johnson et al. |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0085882 A1 | 5/2003 | Lu |
| 2003/0095095 A1 | 5/2003 | Pihlaja |
| 2003/0095096 A1 | 5/2003 | Robbin et al. |
| 2003/0098858 A1 | 5/2003 | Perski et al. |
| 2003/0151600 A1 | 8/2003 | Takeuchi et al. |
| 2003/0174128 A1 | 9/2003 | Matsufusa |
| 2003/0179323 A1 | 9/2003 | Abileah et al. |
| 2003/0201984 A1 | 10/2003 | Falvo |
| 2003/0206162 A1 | 11/2003 | Roberts |
| 2003/0206202 A1 | 11/2003 | Moriya |
| 2003/0222857 A1 | 12/2003 | Abileah |
| 2003/0234768 A1 | 12/2003 | Rekimoto et al. |
| 2003/0234769 A1 | 12/2003 | Cross et al. |
| 2003/0234770 A1 | 12/2003 | MacKey |
| 2004/0022010 A1 | 2/2004 | Shigetaka |
| 2004/0056839 A1 | 3/2004 | Yoshihara |
| 2004/0080501 A1 | 4/2004 | Koyama |
| 2004/0090429 A1 | 5/2004 | Geaghan et al. |
| 2004/0095335 A1 | 5/2004 | Oh et al. |
| 2004/0109097 A1 | 6/2004 | Mai |
| 2004/0119701 A1 | 6/2004 | Mulligan et al. |
| 2004/0141096 A1 | 7/2004 | Mai |
| 2004/0150629 A1 | 8/2004 | Lee |
| 2004/0155871 A1 | 8/2004 | Perski et al. |
| 2004/0155991 A1 | 8/2004 | Lowles et al. |
| 2004/0165005 A1 | 8/2004 | Yoshikawa et al. |
| 2004/0183076 A1 | 9/2004 | Yamazaki et al. |
| 2004/0188150 A1 | 9/2004 | Richard et al. |
| 2004/0189587 A1 | 9/2004 | Jung et al. |
| 2004/0189612 A1 | 9/2004 | Bottari et al. |
| 2004/0217945 A1 | 11/2004 | Miyamoto et al. |
| 2004/0227736 A1 | 11/2004 | Kamrath et al. |
| 2004/0239650 A1 | 12/2004 | Mackey |
| 2004/0243747 A1 | 12/2004 | Rekimoto |
| 2004/0263484 A1 | 12/2004 | Mantysalo et al. |
| 2005/0007349 A1 | 1/2005 | Vakil et al. |
| 2005/0012723 A1 | 1/2005 | Pallakoff |
| 2005/0017737 A1 | 1/2005 | Yakabe et al. |
| 2005/0046621 A1 | 3/2005 | Kakikuranta |
| 2005/0052425 A1 | 3/2005 | Zadesky et al. |
| 2005/0052427 A1 | 3/2005 | Wu et al. |
| 2005/0052582 A1 | 3/2005 | Mai |
| 2005/0062620 A1 | 3/2005 | Schaefer |
| 2005/0073507 A1 | 4/2005 | Richter et al. |
| 2005/0083307 A1 | 4/2005 | Aufderheide et al. |
| 2005/0099402 A1 | 5/2005 | Nakanishi et al. |
| 2005/0104867 A1 | 5/2005 | Westerman et al. |
| 2005/0110768 A1 | 5/2005 | Marriott et al. |
| 2005/0146511 A1 | 7/2005 | Hill et al. |
| 2005/0162402 A1 | 7/2005 | Watanachote |
| 2005/0170668 A1 | 8/2005 | Park et al. |
| 2005/0231487 A1 | 10/2005 | Ming |
| 2005/0237439 A1 | 10/2005 | Mai |
| 2005/0243023 A1 | 11/2005 | Reddy et al. |
| 2006/0007087 A1 | 1/2006 | Choi et al. |
| 2006/0007165 A1 | 1/2006 | Yang et al. |
| 2006/0012575 A1 | 1/2006 | Knapp et al. |
| 2006/0017710 A1 | 1/2006 | Lee et al. |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0033724 A1 | 2/2006 | Chaudhri et al. |
| 2006/0044259 A1 | 3/2006 | Hotelling et al. |
| 2006/0053387 A1 | 3/2006 | Ording |
| 2006/0066582 A1 | 3/2006 | Lyon et al. |
| 2006/0085757 A1 | 4/2006 | Andre et al. |
| 2006/0109222 A1 | 5/2006 | Lee et al. |
| 2006/0132462 A1 | 6/2006 | Geaghan |
| 2006/0145365 A1 | 7/2006 | Halls et al. |

(56) References Cited

U.S. PATENT DOCUMENTS

| | | |
|---|---|---|
| 2006/0145983 A1 | 7/2006 | Lee et al. |
| 2006/0146033 A1 | 7/2006 | Chen et al. |
| 2006/0146034 A1 | 7/2006 | Chen et al. |
| 2006/0197753 A1 | 9/2006 | Hotelling |
| 2006/0227114 A1 | 10/2006 | Geaghan et al. |
| 2006/0232564 A1 | 10/2006 | Nishimura et al. |
| 2006/0232567 A1 | 10/2006 | Westerman et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2006/0244736 A1 | 11/2006 | Tseng |
| 2006/0278444 A1 | 12/2006 | Binstead |
| 2006/0279679 A1 | 12/2006 | Fujisawa et al. |
| 2006/0290863 A1 | 12/2006 | HoeSup |
| 2007/0013678 A1 | 1/2007 | Nakajima et al. |
| 2007/0018969 A1 | 1/2007 | Chen et al. |
| 2007/0027932 A1 | 2/2007 | Thibeault |
| 2007/0062739 A1 | 3/2007 | Philipp et al. |
| 2007/0075977 A1 | 4/2007 | Chen et al. |
| 2007/0085838 A1 | 4/2007 | Ricks et al. |
| 2007/0109274 A1 | 5/2007 | Reynolds |
| 2007/0152976 A1 | 7/2007 | Townsend et al. |
| 2007/0159561 A1 | 7/2007 | Chien |
| 2007/0176905 A1 | 8/2007 | Shih et al. |
| 2007/0182706 A1 | 8/2007 | Cassidy et al. |
| 2007/0216657 A1 | 9/2007 | Konicek |
| 2007/0229464 A1 | 10/2007 | Hotelling et al. |
| 2007/0236466 A1 | 10/2007 | Hotelling |
| 2007/0247429 A1 | 10/2007 | Westerman |
| 2007/0257890 A1 | 11/2007 | Hotelling et al. |
| 2007/0262967 A1 | 11/2007 | Rho |
| 2008/0048994 A1 | 2/2008 | Lee et al. |
| 2008/0055221 A1 | 3/2008 | Yabuta et al. |
| 2008/0055268 A1 | 3/2008 | Yoo et al. |
| 2008/0055270 A1 | 3/2008 | Cho et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0067528 A1 | 3/2008 | Choi et al. |
| 2008/0074401 A1 | 3/2008 | Chung et al. |
| 2008/0079697 A1 | 4/2008 | Lee et al. |
| 2008/0129317 A1 | 6/2008 | Oba |
| 2008/0129898 A1 | 6/2008 | Moon |
| 2008/0131624 A1 | 6/2008 | Egami et al. |
| 2008/0136980 A1 | 6/2008 | Rho et al. |
| 2008/0150901 A1 | 6/2008 | Lowles et al. |
| 2008/0157867 A1 | 7/2008 | Krah |
| 2008/0158167 A1 | 7/2008 | Hotelling et al. |
| 2008/0158181 A1 | 7/2008 | Hamblin et al. |
| 2008/0165158 A1 | 7/2008 | Hotelling et al. |
| 2008/0186288 A1* | 8/2008 | Chang .................. 345/174 |
| 2008/0297476 A1 | 12/2008 | Hotelling et al. |
| 2009/0066670 A1 | 3/2009 | Hotelling et al. |
| 2009/0090694 A1 | 4/2009 | Hotelling et al. |
| 2009/0096757 A1 | 4/2009 | Hotelling et al. |
| 2009/0096758 A1 | 4/2009 | Hotelling et al. |
| 2009/0115743 A1 | 5/2009 | Oowaki |
| 2009/0160816 A1 | 6/2009 | Westerman et al. |
| 2009/0273581 A1 | 11/2009 | Kim et al. |
| 2009/0303193 A1 | 12/2009 | Lim et al. |
| 2010/0066650 A1 | 3/2010 | Lee et al. |
| 2010/0103121 A1 | 4/2010 | Kim et al. |
| 2010/0182273 A1 | 7/2010 | Noguchi et al. |
| 2010/0188347 A1* | 7/2010 | Mizuhashi et al. ........... 345/173 |
| 2010/0194699 A1 | 8/2010 | Chang |
| 2010/0238134 A1 | 9/2010 | Day et al. |
| 2010/0289770 A1 | 11/2010 | Lee et al. |
| 2011/0187677 A1 | 8/2011 | Hotelling |
| 2012/0105371 A1 | 5/2012 | Hotelling et al. |
| 2012/0162104 A1 | 6/2012 | Chang |
| 2012/0268423 A1 | 10/2012 | Hotelling et al. |
| 2013/0106780 A1 | 5/2013 | Hotelling et al. |
| 2014/0062955 A1 | 3/2014 | Hotelling |
| 2014/0078108 A1 | 3/2014 | Hotelling |

FOREIGN PATENT DOCUMENTS

| | | |
|---|---|---|
| CN | 1867882 A | 11/2006 |
| CN | 101241277 A | 8/2008 |
| DE | 197 06 168 A1 | 8/1998 |
| DE | 102 51 296 A1 | 5/2004 |
| EP | 0 156 593 A2 | 10/1985 |
| EP | 0 156 593 A3 | 10/1985 |
| EP | 0 250 931 A2 | 1/1988 |
| EP | 0 250 931 A3 | 1/1988 |
| EP | 0 250 931 B1 | 1/1988 |
| EP | 0 464 908 A2 | 1/1992 |
| EP | 0 464 908 A3 | 1/1992 |
| EP | 0 464 908 B1 | 1/1992 |
| EP | 0 288 692 A2 | 7/1993 |
| EP | 0 288 692 A3 | 7/1993 |
| EP | 0 288 692 B1 | 7/1993 |
| EP | 0 664 504 A2 | 7/1995 |
| EP | 0 786 745 A2 | 7/1997 |
| EP | 0 786 745 A3 | 7/1997 |
| EP | 0 786 745 B1 | 7/1997 |
| EP | 0 932 117 A2 | 7/1999 |
| EP | 0 932 117 A3 | 7/1999 |
| EP | 0 932 117 B1 | 7/1999 |
| EP | 0 973 123 A1 | 1/2000 |
| EP | 1 014 295 A2 | 1/2002 |
| EP | 1 014 295 A3 | 1/2002 |
| EP | 1 211 633 A1 | 6/2002 |
| EP | 1 211 633 B1 | 6/2002 |
| EP | 1 322 104 A1 | 6/2003 |
| EP | 1 391 807 A1 | 2/2004 |
| EP | 1 396 812 A2 | 3/2004 |
| EP | 1 396 812 A3 | 3/2004 |
| EP | 1 418 491 A2 | 5/2004 |
| EP | 1 418 491 A3 | 5/2004 |
| EP | 1 422 601 A1 | 5/2004 |
| EP | 1 455 264 A2 | 9/2004 |
| EP | 1 455 264 A3 | 9/2004 |
| EP | 2 214 084 A1 | 4/2010 |
| EP | 2 267 584 A1 | 12/2010 |
| GB | 1 486 988 A | 9/1977 |
| GB | 2 168 816 A | 6/1986 |
| GB | 2 368 483 A | 7/2004 |
| JP | 53-147626 A | 11/1978 |
| JP | 58-166430 A | 10/1983 |
| JP | 59-214941 A | 12/1984 |
| JP | 60-123927 A | 7/1985 |
| JP | 60-211529 A | 10/1985 |
| JP | 61-131314 A | 6/1986 |
| JP | 63-279316 A | 11/1988 |
| JP | 02-030024 A | 1/1990 |
| JP | 03-180922 A | 8/1991 |
| JP | 03-294918 A | 12/1991 |
| JP | 04-127314 A | 4/1992 |
| JP | 05-053726 A | 3/1993 |
| JP | 05-080923 A | 4/1993 |
| JP | 05-224818 A | 9/1993 |
| JP | 06-161661 A | 6/1994 |
| JP | 07-036017 A | 2/1995 |
| JP | 07-044305 A | 2/1995 |
| JP | 07-110741 A | 4/1995 |
| JP | 07-141086 A | 6/1995 |
| JP | 08-016307 A | 1/1996 |
| JP | 08-147092 A | 6/1996 |
| JP | 08-242458 A | 9/1996 |
| JP | 08-297267 A | 11/1996 |
| JP | 09-054650 A | 2/1997 |
| JP | 09-096792 A | 4/1997 |
| JP | 09-212302 A | 8/1997 |
| JP | 09-292950 A | 11/1997 |
| JP | 10-003349 A | 1/1998 |
| JP | 11-145141 A | 5/1999 |
| JP | 11-505641 A | 5/1999 |

(56) References Cited

FOREIGN PATENT DOCUMENTS

| | | |
|---|---|---|
| JP | 11-249813 A | 9/1999 |
| JP | 2000-105670 A | 4/2000 |
| JP | 2000-112642 A | 4/2000 |
| JP | 2000-163031 A | 6/2000 |
| JP | 2000-172437 A | 6/2000 |
| JP | 2000-172447 A | 6/2000 |
| JP | 2000-221932 A | 8/2000 |
| JP | 2001-283228 A | 10/2001 |
| JP | 2002-501271 A | 1/2002 |
| JP | 2002-116017 A | 4/2002 |
| JP | 2002-259052 A | 9/2002 |
| JP | 2002-287660 A | 10/2002 |
| JP | 2002-342014 A | 11/2002 |
| JP | 2002-342033 A | 11/2002 |
| JP | 2002-366304 A | 12/2002 |
| JP | 2003-029899 A | 1/2003 |
| JP | 2003-099192 A | 4/2003 |
| JP | 2003-173237 A | 6/2003 |
| JP | 2003-185688 A | 7/2003 |
| JP | 2003-196023 A | 7/2003 |
| JP | 2003-249738 A | 9/2003 |
| JP | 2003-255855 A | 9/2003 |
| JP | 2004-038919 A | 2/2004 |
| JP | 2004-102985 A | 4/2004 |
| JP | 2004-186333 A | 7/2004 |
| JP | 2005-346047 A | 12/2005 |
| JP | 2007-533044 T | 11/2007 |
| JP | 2008-032756 A | 2/2008 |
| JP | 2009-244958 A | 10/2009 |
| KR | 10-0226812 B1 | 7/1999 |
| KR | 10-2004-0002310 A | 1/2004 |
| KR | 10-2004-0013029 A | 2/2004 |
| KR | 10-2004-0022243 A | 3/2004 |
| KR | 10-2005-0019799 A | 3/2005 |
| KR | 10-2006-0089645 A | 8/2006 |
| TW | 200302778 A | 8/2003 |
| TW | 2004-21156 A | 10/2004 |
| TW | 200529441 A | 9/2005 |
| WO | WO-87/04553 A1 | 7/1987 |
| WO | WO-92/13328 A1 | 8/1992 |
| WO | WO-96/15464 A1 | 5/1996 |
| WO | WO-96/18179 A1 | 6/1996 |
| WO | WO-97/18547 A1 | 5/1997 |
| WO | WO-97/23738 A1 | 7/1997 |
| WO | WO-98/14863 A1 | 4/1998 |
| WO | WO-99/38149 A1 | 7/1999 |
| WO | WO-01/27868 A1 | 4/2001 |
| WO | WO-03/079176 A1 | 9/2003 |
| WO | WO-03/088176 A1 | 10/2003 |
| WO | WO-2004/013833 A2 | 2/2004 |
| WO | WO-2004/013833 A3 | 2/2004 |
| WO | WO-2004/023376 A2 | 3/2004 |
| WO | WO-2004/023376 A3 | 3/2004 |
| WO | WO-2004/053576 A1 | 6/2004 |
| WO | WO-2004/061808 A2 | 7/2004 |
| WO | WO-2004/061808 A3 | 7/2004 |
| WO | WO-2004/114265 A2 | 12/2004 |
| WO | WO-2005/064451 A1 | 7/2005 |
| WO | WO-2005/114369 A2 | 12/2005 |
| WO | WO-2006/023569 A1 | 3/2006 |
| WO | WO-2006/054585 A1 | 5/2006 |
| WO | WO-2007/115032 A2 | 10/2007 |
| WO | WO-2007/115032 A3 | 10/2007 |
| WO | WO-2007/146779 A2 | 12/2007 |
| WO | WO-2007/146779 A3 | 12/2007 |
| WO | WO-2007/146780 A2 | 12/2007 |
| WO | WO-2007/146780 A3 | 12/2007 |
| WO | WO-2007/146783 A2 | 12/2007 |
| WO | WO-2007/146783 A3 | 12/2007 |
| WO | WO-2007/146785 A2 | 12/2007 |
| WO | WO-2007/146785 A3 | 12/2007 |
| WO | WO-2008/085457 A2 | 7/2008 |
| WO | WO-2008/085457 A3 | 7/2008 |
| WO | WO-2009/035471 A1 | 3/2009 |
| WO | WO-2010/137727 A1 | 2/2010 |
| WO | WO-2012/087639 A2 | 6/2012 |

OTHER PUBLICATIONS

International Search Report mailed Jun. 15, 2012, for PCT/US2011/064455, filed Dec. 12, 2011, four pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Notice of Allowance mailed Jul. 12, 2012, for U.S. Appl. No. 13/251,099, filed Sep. 30, 2011, seven pages.

Netherlands Search Report dated Jul. 2, 2013, for Dutch Patent Application No. 2008003, ten pages.

Non-Final Office Action mailed May 30, 2013, for U.S. Appl. No. 13/251,099, filed Sep. 30, 2011, seven pages.

Non-Final Office Action mailed Jun. 27, 2013, for U.S. Appl. No. 11/760,080, filed Jun. 8, 2007, 48 pages.

Notice of Allowance mailed Apr. 26, 2013, for U.S. Appl. No. 11/650,203, filed Jan. 3, 2007, 8 pages.

Notice of Allowance mailed May 28, 2013, for U.S. Appl. No. 11/760,049, filed Jun. 8, 2007, 10 pages.

Notice of Allowance mailed Jul. 19, 2013, for U.S. Appl. No. 13/717,573, filed Dec. 17, 2012, eight pages.

Request for Ex Parte Reexamination of U.S. Patent No. 7,663,607, 106 pages.

U.S. Appl. No. 60/406,662, filed Aug. 29, 2002, by Morag et al.

Non-Final Office Action mailed Mar. 29, 2013, for U.S. Appl. No. 13/717,573, filed Dec. 17, 2012, five pages.

Notice of Allowance mailed Feb. 6, 2013, for U.S. Appl. No. 13/084,402, filed Apr. 11, 2011, 13 pages.

Notice of Allowance mailed Feb. 19, 2013, for U.S. Appl. No. 13/538,498, filed Jun. 29, 2012, 16 pages.

European Search Report mailed Jul. 28, 2011, for EP Application No. 11159164.0, filed Jun. 8, 2007, eight pages.

European Search Report mailed Oct. 21, 2011, for EP Application No. 11159166.5, filed Jun. 8, 2007, seven pages.

Final Office Action mailed Jul. 6, 2010, for U.S. Appl. No. 11/760,036, filed Jun. 8, 2007, 51 pages.

Final Office Action mailed Jul. 6, 2010, for U.S. Appl. No. 11/760,080, filed Jun. 8, 2007, 66 pages.

Final Office Action mailed Jul. 22, 2010, for U.S. Appl. No. 11/760,049, filed Jun. 8, 2007, 52 pages.

Final Office Action mailed Aug. 2, 2010, for U.S. Appl. No. 11/760,060, filed Jun. 8, 2007, 78 pages.

Final Office Action mailed Dec. 16, 2011, for U.S. Appl. No. 11/760,036, filed Jun. 8, 2007, 53 pages.

Final Office Action mailed Jan. 30, 2012, for U.S. Appl. No. 11/760,049, filed Jun. 8, 2007, 64 pages.

Final Office Action mailed Feb. 27, 2012, for U.S. Appl. No. 11/760,080, filed Jun. 8, 2007, 62 pages.

Hector, J. et al. (May 2002). "Low Power Driving Options for an AMLCD Mobile Display Chipset," Chapter 16.3 in *SID 02 Digest* (2002 SID International Symposium, Digest of Technical Papers), XXXIII(II):694-697.

International Search Report mailed Mar. 6, 2008, for PCT Application No. PCT/2007/70733, filed Jun. 8, 2007, five pages.

International Search Report mailed Mar. 7, 2008, for PCT Application No. PCT/2007/70722, filed Jun. 8, 2007, three pages.

International Search Report mailed Jul. 18, 2008, for PCT Application No. PCT/2007/70725, filed Jun. 8, 2007, six pages.

(56) References Cited

OTHER PUBLICATIONS

International Search Report mailed Jul. 18, 2008, for PCT Application No. PCT/2007/70729, filed Jun. 8, 2007, five pages. (98.42).
Kanda, E. et al. (2008). "55.2: Integrated Active Matrix Capacitive Sensors for Touch Panel LTPS-TFT LCDs," *SID 08 Digest*, pp. 834-837.
Non-Final Office Action mailed Mar. 12, 2010, for U.S. Appl. No. 11/760,080, filed Jun. 8, 2007, 31 pages.
Non-Final Office Action mailed Apr. 22, 2010, for U.S. Appl. No. 11/760,036, filed Jun. 8, 2007, 37 pages.
Non-Final Office Action mailed Apr. 23, 2010, for U.S. Appl. No. 11/760,060, filed Jun. 8, 2007, 66 pages.
Non-Final Office Action mailed May 5, 2010, for U.S. Appl. No. 11/760,049, filed Jun. 8, 2007, 65 pages.
Non-Final Office Action mailed Aug. 4, 2011, for U.S. Appl. No. 11/760,036, filed Jun. 8, 2007, 45 pages.
Non-Final Office Action mailed Aug. 11, 2011, for U.S. Appl. No. 11/760,049, filed Jun. 8, 2007, 60 pages.
Non-Final Office Action mailed Sep. 1, 2011, for U.S. Appl. No. 11/760,060, filed Jun. 8, 2007, 76 pages.
Non-Final Office Action mailed Nov. 14, 2011, for U.S. Appl. No. 11/760,080, filed Jun. 8, 2007, 60 pages.
Non-Final Office Action mailed Oct. 11, 2012, for U.S. Appl. No. 13/538,498, filed Jun. 29, 2012, 17 pages.
Notice of Allowance mailed Mar. 27, 2012, for U.S. Appl. No. 11/760,060, filed Jun. 8, 2007, 17 pages.
Notice of Allowance mailed Apr. 27, 2012, for U.S. Appl. No. 11/760,036, filed Jun. 8, 2007, eight pages.
Partial European Search Report mailed Mar. 15, 2011, for EP Application No. 10178661.4, filed Jun. 8, 2007, six pages.
Partial European Search Report mailed Oct. 21, 2011, for EP Application No. 11159165.7 filed Jun. 8, 2007, seven pages.
Partial European Search Report mailed Oct. 24, 2011, for EP Application No. 11159167.3 filed Jun. 8, 2007, eight pages.
"Gesture Recognition," (2006). Located at <http://www.fingerworks.com/gesture_recognition.html>, last visited Jul. 25, 2006, two pages.
3M (2002). MicroTouch Capacitive Touch Screens Datasheets, 3M Innovation, six pages.
Agrawal, R. et al. (Jul. 1986). "An Overview of Tactile Sensing," Center for Research on Integrated Manufacturing: Robot Systems Division, The University of Michigan, 47 pages.
Anonymous. (May 8, 1992). "The Sensor Frame Graphic Manipulator," *NASA Phase II Final Report*, 28 pages.
Anonymous. (Oct. 30, 2001). "Radiotelephone with Rotating Symbol Keypad and Multi-Directional Symbol Input,"located at www.vitgn.com/mobile_terminal.com, 12 pages.
Anonymous. "4-Wire Resistive Touchscreens" obtained from http://www.touchscreens.com/intro-touchtypes-4resistive.html generated Aug. 5, 2005.
Anonymous. "5-Wire Resistive Touchscreens" obtained from http://www.touchscreens.com/intro-touchtypes-resistive.html generated Aug. 5, 2005.
Anonymous. "A Brief Overview of Gesture Recognition" obtained from http://www. Dai. Ed. Ac.uk/Cvonline/LOCA_COPIES/COHEN/gesture_overview.Html, generated Apr. 20, 2004.
Anonymous. "Capacitive Position Sensing" obtained from http://www.synaptics.com/technology/cps.cfin generated Aug. 5, 2005.
Anonymous. "Capacitive Touchscreens" obtained from http://www.touchscreens.com/intro-touchtypes-capacitive.html generated Aug. 5, 2005.
Anonymous. "Comparing Touch Technologies" obtained from http://www.touchscreens.com/intro-touchtypes.html generated Oct. 10, 2004.
Anonymous. "FingerWorks—Gesture Guide—Application Switching," obtained from http://www.fingerworks.com/gesture_guide_apps.html, generated on Aug. 27, 2004, 1-pg.
Anonymous. "FingerWorks—Gesture Guide—Editing," obtained from http://www.fingerworks.com/gesure_guide_editing.html, generated on Aug. 27, 2004, 1-pg.
Anonymous. "FingerWorks—Gesture Guide—File Operations," obtained from http://www.fingerworks.com/gesture_guide_files.html, generated on Aug. 27, 2004, 1-pg.
Anonymous. "FingerWorks—Gesture Guide—Text Manipulation," obtained from http://www.fingerworks.com/gesture_guide_text_manip.html, generated on Aug. 27, 2004, 2-pg.
Anonymous. "FingerWorks—Gesture Guide—Tips and Tricks," obtained from http://www.fingerworks.com/gesture_guide_tips.html, generated Aug. 27, 2004, 2-pgs.
Anonymous. "FingerWorks—Gesture Guide—Web," obtained from http://www.fingerworks.com/gesture_guide_web.html, generated on Aug. 27, 2004, 1-pg.
Anonymous. "FingerWorks—Guide to Hand Gestures for USB Touchpads," obtained from http://www.fingerworks.com/igesture_userguide.html, generated Aug. 27, 2004, 1-pg.
Anonymous. "FingerWorks—iGesture—Technical Details," obtained from http://www.fingerworks.com/igesture_tech.html, generated Aug. 27, 2004, 1-pg.
Anonymous. "FingerWorks—The Only Touchpads with Ergonomic Full-Hand Resting and Relaxation!" obtained from http://www.fingerworks.com/resting.html, Copyright 2001, 1-pg.
Anonymous. "FingerWorks—Tips for Typing on the Mini," obtained from http://www.fingerworks.com/mini_typing.html, generated on Aug. 27, 2004, 2-pgs.
Anonymous. "GlidePoint®" obtained from http://www.cirque.com/technology/technology_gp.html generated Aug. 5, 2005.
Anonymous. "How do touchscreen monitors know where you're touching?" obtained from http://www.electronics.howstuffworks.com/question716.html generated Aug. 5, 2005.
Anonymous. "How does a touchscreen work?" obtained from http://www.touchscreens.com/intro-anatomy.html generated Aug. 5, 2005.
Anonymous. "iGesture Pad—the MultiFinger USB TouchPad with Whole-Hand Gestures,"obtained from http://www.fingerworks.com/igesture.html, generated Aug. 27, 2004, 2-pgs.
Anonymous. "iGesture Products for Everyone (learn in minutes) Product Overview"FingerWorks.com downloaded Aug. 30, 2005.
Anonymous. "Infrared Touchscreens" obtained from http://www.touchscreens.com/intro-touchtypes-infrared.html generated Aug. 5, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.
Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.
Anonymous. "Surface Acoustic Wave Touchscreens" obtained from http://www.touchscreens.com/intro-touchtypes-saw.html generated Aug. 5, 2005.
Anonymous. "Symbol Commander" obtained from http://www.sensiva.com/symbolcommander/, generated Aug. 30, 2005.
Anonymous. "Touch Technologies Overview" 2001, 3M Touch Systems, Massachusetts.
Anonymous. "Touchscreen Technology Choices," <http://www.elotouch.com/products/detech2.asp>, downloaded Aug. 5, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ij/plugins/watershed.html generated Aug. 5, 2005.
Baxter, L.K. (1996). *Capacitive Sensors: Design and Applications*, vol. 1 of IEEE Press Series on Electronics Technology, John Wiley & Sons: New York, NY, (Table of Contents Only) three pages.

(56) References Cited

OTHER PUBLICATIONS

Bennion, S.I. et al. (Dec. 1981). "Touch Sensitive Graphics Terminal Applied to Process Control," *Computer Graphics* 15(4):342-350.
Bier et al., "Toolglass and Magic Lenses: The see-through interface" in James Kijiya, editor, Computer Graphics (SIGGRAPH '93 Proceedings), vol. 27, pp. 73-80, Aug. 1993.
Boie, R.A. (Mar. 1984). "Capacitive Impedance Readout Tactile Image Sensor," *Proceedings of 1984 IEEE International Conference on Robotics and Automation*, pp. 370-378.
Buxton, W.A.S. (Mar./Apr. 1994). "Combined Keyboard/Touch Tablet Input Device," *Xerox Disclosure Journal* 19(2):109-111.
Chun, K. et al. (Jul. 1985). "A High-Performance Silicon Tactile Imager Based on a Capacitive Cell," *IEEE Transactions on Electron Devices* 32(7):1196-1201.
Cliff (Jul. 24, 2002). "Building a Pressure-Sensitive, Multi-Point TouchScreen?" Posted from the D-I-Y-Baby Department, one page.
Collberg, C. et al. (2002). "TetraTetris: A Study of Multi-User Touch-Based Interaction Using DiamondTouch," located at cs.arizona.edu, eight pages.
Dannenberg, R.B. et al. (1989). "A Gesture Based User Interface Prototyping System," *ACM*, pp. 127-132.
Davies, E.R. (Aug. 1987). "Lateral Histograms for Efficient Object Location: Speed versus Ambiguity," *Pattern Recognition Letters* 6(3):189-198.
Davies, E.R. (1990). *Machine Vision: Theory, Algorithms, Practicalities*, Academic Press, Inc..: San Diego, CA, pp. xi-xxi (Table of Contents Only.).
Davies, E.R. (1997). "Boundary Pattern Analysis," Chapter 7 in *Machine Vision: Theory, Algorithms, Practicalities*, 2nd Edition, Academic Press, Inc.: San Diego, CA, pp. 171-191.
Davies, E.R. (1997). "Ellipse Detection," Chapter 11 in *Machine Vision: Theory, Algorithms, Practicalities*, 2nd Edition, Academic Press, Inc.: San Diego, CA, pp. 271-290.
Davies, E.R. (1997). "Image Acquisition," Chapter 23 in *Machine Vision: Theory, Algorithms, Practicalities*, 2nd Edition, Academic Press, Inc.: San Diego, CA, pp. 583-601.
Diaz-Marino, R.A. et al. (2003). "Programming for Multiple Touches and Multiple Users: A Toolkit for the DiamondTouch Hardware," *Proceedings of ACM UIST'03 User Interface Software and Technology*, two pages.
Dietz, P. et al. (2001). "DiamondTouch: A Multi-User Touch Technology," *Proceedings of the 14th Annual ACM Symposium on User Interface Software and Technology*, Nov. 11-14, 2001, Orlando, FL, pp. 219-226.
Douglas et al., *The Ergonomics of Computer Pointing Devices* (1997).
Esenther, A. et al. (Nov. 2002). "DiamondTouch SDK: Support for Multi-User, Multi-Touch Applications," *Mitsubishi Electric Research Laboratories, Inc.*, five pages.
European Search Report mailed Feb. 16, 2012, for EP Application No. 11183531.0, 11 pages.
European Search Report mailed Mar. 27, 2012, for EP Application No. 10178558.2, nine pages.
European Search Report received in EP 1 621 989 (@ *Beyer Weaver & Thomas, LLP*) dated Mar. 27, 2006.
EVB Elektronik "TSOP6238 IR Receiver Modules for Infrared Remote Control Systems" dated Jan. 2004 1-pg.
Fearing, R.S. (Jun. 1990). "Tactile Sensing Mechanisms," *The International Journal of Robotics Research* 9(3):3-23.
Final Office Action mailed Sep. 1, 2011, for U.S. Appl. No. 11/650,203, filed Jan. 3, 2007, nine pages.
Final Office Action mailed Oct. 17, 2011, for U.S. Appl. No. 11/818,395, filed Jun. 13, 2007, 16 pages.
Fisher et al., "Repetitive Motion Disorders: The Design of Optimal Rate- Rest Profiles," Human Factors, 35(2):283-304 (Jun. 1993).
Fukumoto and Yoshinobu Tonomura, "Body Coupled Fingering: Wireless Wearable Keyboard," *CHI97*, pp. 147-154 (Mar. 1997).
Fukumoto et al., "ActiveClick: Tactile Feedback for Touch Panels," in CHI 2001 Summary, pp. 121-122, 2001.
Hardy, "Fingerworks" Mar. 7, 2002; BBC World on Line.
Hillier and Gerald J. Lieberman, *Introduction to Operations Research* (1986).
Hinckley et al., "Touch-Sensing Input Devices," in CHI '99 Proceedings, pp. 223-230, 1999.
Hinckley, K. et al. (1998). "Interaction and Modeling Techniques for Desktop Two-Handed Input," *Proceedings of ACM USIT'98 Symposium on User Interface Software and Technology*, pp. 49-58.
Hinckley, K. et al. (May 1999). "Touch-Sensing Input Devices," *CHI 99* pp. 223-230.
Hinckley, K. et al. (2000). "Sensing Techniques for Mobile Interaction," *CHI Letters* 2(2):91-100.
Hlady, A.M. (1969). "A Touch Sensitive X-Y Position Encoder for Computer Input," *Fall Joint Computer Conference*, pp. 545-551.
Hotelling et al., Office action for U.S. Appl. No. 10/840,862 mailed May 14, 2008.
International Search Report dated Mar. 3, 2006 (PCT/US 05/03325; 119-0052WO).
International search report for International Application No. PCT/US2005/014364 mailed Jan. 12, 2005.
International Search Report mailed Jun. 24, 2008, for PCT Application No. PCT/US2007/026298, filed Dec. 21, 2007, two pages.
International Search Report mailed Oct. 16, 2008, for PCT Application No. PCT/US2007/088749, filed Dec. 21, 2007, four pages.
International Search Report received in corresponding PCT application No. PCT/US2006/008349 dated Oct. 6, 2006.
Jacob et al., "Integrality and Separability of Input Devices," *ACM Transactions on Computer-Human Interaction*, 1:3-26 (Mar. 1994).
Kionx "KXP84 Series Summary Data Sheet" copyright 2005, dated Oct. 21, 2005, 4-pgs.
Kirk, D.E. (1970). "Numerical Determination of Optimal Trajectories," Chapter 6 in *Optimal Control Theory: An Introduction*, Prentice Hall, Inc.: Englewood Cliffs, NY. pp. 329-413, with Table of Contents, pp. vii-ix. (90 pages total).
Kling, M. et al. (Sep. 2003). "Interface Design: LCD Touch Interface for ETRAX 100LX," Thesis Submitted in Partial Fulfillment of the Requirements for the Degree of Master of Science, Umea University, Umea, Sweden, 79 pages.
Ko, H. (Jul. 2000). "Open Systems Advanced Workstation Transition Report," Technical Report 1822, *U.S. Navy*, SSC San Diego, CA, 82 pages.
Krein, P. et al. (May/Jun. 1990). "The Electroquasistatics of the Capacitive Touch Panel," *IEEE Transactions on Industry Applications* 26(3):529-534.
Krueger, M. et al. (Jun. 10, 1988). "Videoplace, Responsive Environment, 1972-1990," located at http://www.youtube.com/watch?v=dmmxVA5xhuo, last visited Aug. 5, 2011, two pages.
Lee, "A Fast Multiple-Touch-Sensitive Input Device," Master's Thesis, University of Toronto. (1984).
Leigh, J. et al. (2002). "Amplified Collaboration Environments," *VizGrid Symposium*, Nov. 2002, Tokyo, Japan, nine pages.
Ljungstrand, P. et al. eds. (2002). UBICOMP2002, Adjunct Proceedings, *4th International Conference on Ubiquitous Computing*, Sep. 29-Oct. 1, 2002, Goteborg, Sweden, 90 pages.
Magerkurth, C. et al. (2004). "Towards the Next Generation of Tabletop Gaming Experiences," *Graphics Interface 2004 (GI'04)*, May 17-19, 2004, Ontario, Canada, pp. 1-8.
Malik, S. et al. (2004). "Visual Touchpad: A Two-Handed Gestural Input Device,"*ICMI'04 Proceedings of the 6th International Conference on Multimodal Intercases, ACM*, 8 pages.
Matsushita et al., "HoloWall: Designing a Finger, Hand, Body and Object Sensitive Wall," in Proceedings of UIST '97, Oct. 1997.
Matsushita, N. et al. (2000). "Dual Touch: A Two-Handed Interface for Pen-Based PDAs," *CHI Letters* 2(2):211-212.
McMillan, G.R. (Oct. 1998). "The Technology and Applications of Gesture-Based Control," *presented at the RTO Lecture Series on Alternative Control Technologies: Human Factor Issues*, Oct. 14-15, 1998, Ohio, USA, pp. 4-1-4-11.
Mehta, N. et al. (May 1982). "Feature Extraction as a Tool for Computer Input," *Proceedings of ICASSP '82*, May 3-5, 1982, Paris, France, pp. 818-820.
Mitchell, G. D. (Oct. 2003). "Orientation on Tabletop Displays," Thesis Submitted in Partial Fulfillment of the Requirements for the Degree of Master of Science, Simon Fraser University, 119 pages.

(56) References Cited

OTHER PUBLICATIONS

Noda, K. et al. (2001). "Production of Transparent Conductive Films with Inserted SiO$_2$ Anchor Layer, and Application to a Resistive Touch Panel," *Electronics and Communications in Japan* Part 2 84(7):39-45.
Non-Final Office Action mailed May 14, 2008, for U.S. Appl. No. 10/840,862, filed May 6, 2004, six pages.
Non-Final Office Action mailed Dec. 24, 2008, for U.S. Appl. No. 10/840,862, filed May 6, 2004, nine pages.
Non-Final Office Action mailed Jun. 2, 2009, for U.S. Appl. No. 10/840,862, filed May 6, 2004, seven pages.
Non-Final Office Action mailed Nov. 12, 2009, for U.S. Appl. No. 10/840,862, filed May 6, 2004, eight pages.
Non-Final Office Action mailed Jun. 21, 2010, for U.S. Appl. No. 11/650,203, filed Jan. 3, 2007, eight pages.
Non-Final Office Action mailed Jan. 25, 2011, for U.S. Appl. No. 11/818,395, filed Jun. 13, 2007, 31 pages.
Non-Final Office Action mailed Mar. 14, 2011, for U.S. Appl. No. 11/650,203, filed Jan. 3, 2007, nine pages.
Non-Final Office Action mailed May 13, 2011, for U.S. Appl. No. 12/267,540, filed Nov. 7, 2008, seven pages.
Non-Final Office Action mailed Jul. 8, 2011, for U.S. Appl. No. 12/267,532, filed Nov. 7, 2008, five pages.
Non-Final Office Action mailed Jul. 14, 2011, for U.S. Appl. No. 12/267,522, filed Nov. 7, 2008, six pages.
Non-Final Office Action mailed Jun. 20, 2012, for U.S. Appl. No. 13/345,347, filed Jan. 6, 2012, five pages.
Non-Final Office Action mailed Sep. 12, 2012, for U.S. Appl. No. 11/650,203, filed Jan. 3, 2007, nine pages.
Notice of Allowance mailed Oct. 25, 2011, for U.S. Appl. No. 12/267,540, filed Nov. 7, 2008, seven pages.
Notice of Allowance mailed Sep. 19, 2012, for U.S. Appl. No. 13/345,347, filed Jan. 6, 2012, seven pages.
Notice of Allowance mailed Oct. 29, 2012, for U.S. Appl. No. 13/345,347, filed Jan. 6, 2012, eight pages.
Ogawa, H. et al. (1979). "Preprocessing for Chinese Character Recognition and Global Classification of Handwritten Chinese Characters," *Pattern Recognition* 11:1-7.
Phipps, C.A. (Spring 2003). "A Metric to Measure Whole Keyboard Index of Difficulty Based on Fitts' Law," A Dissertation Submitted in Partial Fulfillment of the Requirements for the Degree of Ph.D., 103 pages.
Quantum Research Group Ltd. (1997). QT9701B2 Datasheet, 30 pages.
Quantum Research Group Ltd. (1999). QProx™ QT60320 32-Key Qmatrix™ Charge-Transfer IC Datasheet, pp. 1-14.
Quantum Research Group Ltd. (2001). QT60325, QT60485, QT60645 32, 48, 64 Key QMatrix™ Keypanel Sensor Ics Datasheet, 42 pages.
Quantum Research Group Ltd. (2002). QMatrix™ QT60040 4-Key Charge-Transfer IC Datasheet, pp. 1-9.
Quantum Research Group Ltd. (Oct. 10, 2002). Quantum Research Application Note AN-KD01: Qmatrix™ Panel Design Guidelines, four pages.
Quantum Research Group "QT510 / Qwheel™ Touch Slider IC" copyright 2004-2005, 14-pgs.
Quek, "Unencumbered Gestural Interaction," *IEEE Multimedia*, 3:36-47 (Winter 1996).
Rabuffetti, M. (2002). "Touch-screen System for Assessing Visuomotor Exploratory Skills in Neuropsychological Disorders of Spatial Cognition," *Medical & Biological Engineering & Computing* 40:675-686.
Radwin, "Activation Force and Travel Effects on Overexertion in Repetitive Key Tapping," *Human Factors*, 39(1):130-140 (Mar. 1997).
Raisamo, R. (Dec. 7, 1999). "Multimodal Human-Computer Interaction: A Constructive and Empirical Study," Dissertation, University of Tampere, Finland, 86 pages.
Rekimoto et al., "ToolStone: Effective Use of the Physical Manipulation Vocabularies of Input Devices," in Proc. of UIST 2000, 2000.
Rekimoto, J. (2002). "SmartSkin: An Infrastructure for Freehand Manipulation on Interactive Surfaces," *CHI 2002*, Apr. 20-25, 2002. [(Apr. 25, 2002). 4(1):113-120.].
Rekimoto, J. et al. (2003). "Pre-Sense: Interaction Techniques for Finger Sensing Input Devices," *CHI Letters* 5(2):203-212.
Rong, J. et al. (2002). "AIAA 2002-4553: Hierarchical Agent Based System for General Aviation CD&R Under Free Flight,"*AIAA Guidance, Navigation, and Control Conference and Exhibit*, Aug. 5-8, 2002, Monterey, CA, pp. 1-11.
Rubine et al., "Programmable Finger-Tracking Instrument Controllers," *Computer Music Journal*, vol. 14, No. 1 (Spring 1990).
Rubine, D. (Jul. 1991). "Specifying Gestures by Example," *Computer Graphics* 25(4):329-337.
Rubine, D. et al. (1988). "The VideoHarp," *Proceedings of the 14$^{th}$ International Computer Music Conference*, Cologne, W. Germany, Sep. 20-25, 1988, pp. 49-55.
Rubine, D. et al. (1991). "The Videoharp: An Optical Scanning MIDI Controller," *Contemporary Music Review* 6(1):31-46.
Russell, D.M. et al. (2004). "The Use Patterns of Large, Interactive Display Surfaces: Case Studies of Media Design and use for BlueBoard and MERBoard," *Proceedings of the 37$^{th}$ Hawaii International Conference on System Sciences 2004, IEEE*, pp. 1-10.
Rutledge et al., "Force-To-Motion Functions for Pointing," Human-Computer Interaction—Interact (1990).
Sears, A. (Mar. 11, 1991). "Improving Touchscreen Keyboards: Design Issues and a Comparison with Other Devices," *Human-Computer Interaction Laboratory*, pp. 1-19.
Sears, A. et al. (Jun. 1990). "A New Era for High-Precision Touchscreens," *Advances in Human-Computer Interaction*, vol. 3, Tech Report HCIL-90-01, one page only.
Segen, J. et al. (1998). "Human-Computer Interaction Using Gesture Recognition and 3D Hand Tracking," *IEEE*, pp. 188-192.
Shen, C. et al. (Jan. 2004). "DiamondSpin: An Extensible Toolkit for Around-the-Table Interaction," *CHI 2004*, Apr. 24-29, 2004, Vienna, Austria, 10 pgs.
Siegel, D.M. et al. (1987). "Performance Analysis of a Tactile Sensor," *IEEE*, pp. 1493-1499.
Singapore Examination Report mailed Jan. 11, 2010, for SG Patent Application No. 0607116-1, five pages.
Son, J.S. et al. (1996). "Comparison of Contact Sensor Localization Abilities During Manipulation," *Robotics and Autonomous System* 17 pp. 217-233.
Stansfield, S.A. (Mar. 1990). "Haptic Perception With an Articulated, Sensate Robot Hand," *Sandia Report*: SAND90—0085—UC-406, 37 pages.
Stauffer, R.N. ed. (Jun. 1983). "Progress in Tactile Sensor Development," *Robotics Today* pp. 43-49.
Stumpe, B. (Mar. 16, 1977). "A New Principle for an X-Y Touch Screen," *CERN*, 19 pages.
Stumpe, B. (Feb. 6, 1978). "Experiments to Find a Manufacturing Process for an X-Y Touch Screen: Report on a Visit to Polymer-Physik GmbH," *CERN*, five pages.
Subatai Ahmad, "A Usable Real-Time 3D Hand Tracker," Proceedings of the 28$^{th}$ Asilomar Conference on Signals, Systems and Computers—Part 2 (of2), vol. 2 (Oct. 1994).
Sugiyama, S. et al. (Mar. 1990). "Tactile Image Detection Using a 1k-element Silicon Pressure Sensor Array," *Sensors and Actuators* A21-A23 (1-3):397-400.
Suzuki, K. et al. (Aug. 1990). "A 1024-Element High-Performance Silicon Tactile Imager," *IEEE Transactions on Electron Devices* 37(8):1852-1860.
Texas Instruments "TSC2003 / I2C Touch Screen Controller" Data Sheet SBAS 162, dated Oct. 2001, 20-pgs.
TW Search Report mailed Jun. 27, 2011, for TW Patent Application No. 097100481, one page.
U.S. Appl. No. 10/789,676, filed Feb. 27, 2004 entitled "Shape Detecting Input Device."
U.S. Appl. No. 11/015,978, filed Dec. 17, 2004.
U.S. Appl. No. 60/072,509, filed Jan. 26, 1998, by Westerman et al.
U.S. Appl. No. 60/333,770, filed Nov. 29, 2001, by Perski et al.
U.S. Appl. No. 60/501,484, filed Sep. 5, 2003, by Perski et al.

(56) References Cited

OTHER PUBLICATIONS

Van Kleek, M. (Feb. 2003). "Intelligent Environments for Informal Public Spaces: The Ki/o Kiosk Platform," Thesis Submitted in Partial Fulfillment of the Requirements for the Degree of Master of Engineering, MIT, 108 pages.

Van Oversteegen, B.G.F.A.W. (Apr. 10, 1998). "Touch Screen Based Measuring Equipment: Design and Implementation," Master's Thesis, Submitted to Technische Universiteit, Eindhoven, The Nederlands, 103 pages.

Vazquez, A.A. (Sep. 1990). "Touch Screen Use on Flight Simulator Instructor/Operator Stations," Thesis Submitted in Partial Fulfillment of the Requirements for the Degree of Master of Science in Information Systems, 78 pages.

Vernier, F. et al. (2002). "Multi-User, Multi-Finger Drag & Drop of Multiple Documents,"located at http://www.edgelab.ca/CSCW/Workshop2002/fred_vernier, three pages.

Wacom Company Limited. (Nov. 12, 2003). Wacom intuos®2 User's Manual for Windows®, English V4.1, 165 pages.

Wallergard, M. (2003). "Designing Virtual Environments for Brain Injury Rehabilitation," Thesis, Lund University, Sweden, 98 pages.

Wellner, "The Digital Desk Calculators: Tangible Manipulation on a Desk Top Display" in ACM UIST '91 Proceedings, pp. 27-34, Nov. 1991.

Westerman, W. et al. (2001). "Multi-Touch: A New Tactile 2-D Gesture Interface for Human-Computer Interaction," *Proceedings of the Human Factors and Ergonomics Societ 45th Annual Meeting*, pp. 632-636.

Williams, "Applications for a Switched-Capacitor Instrumentation Building Block" Linear Technology Application Note 3, Jul. 1985, pp. 1-16.

Wu, M. et al. (2003). "Multi-Finger and Whole Hand Gestural Interaction Techniques for Multi-User Tabletop Displays," *ACM* pp. 193-202.

Yamada et al., "A Switched-Capacitor Interface for Capacitive Pressure Sensors" IEEE Transactions on Instrumentation and Measurement, vol. 41, No. 1, Feb. 1992, pp. 81-86.

Yee, K-P. (2004). "Two-Handed Interaction on a Tablet Display,"CHI'04, pp. 1493-1496.

Yeh et al., "Switched Capacitor Interface Circuit for Capacitive Transducers" 1985 IEEE.

Zhai et al., "Dual Stream Input for Pointing and Scrolling," *Proceedings of CHI '97 Extended Abstracts* (1997).

Zimmerman et al., "Applying Electric Field Sensing to Human-Computer Interfaces," in CHI '85 Proceedings, pp. 280-287, 1995.

Notice of Allowance mailed Oct. 10, 2013, for U.S. Appl. No. 11/760,080, filed Jun. 8, 2007, ten pages.

Non-Final Office Action mailed Mar. 25, 2014, for U.S. Appl. No. 14/073,818, filed Nov. 6, 2013, six pages.

Notice of Allowance mailed Mar. 3, 2014, for U.S. Appl. No. 13/251,099, filed Sep. 30, 2011, eight pages.

TW Search Report mailed Feb. 21, 2014, for TW Patent Application No. 100145112, with English translation, two pages.

\* cited by examiner

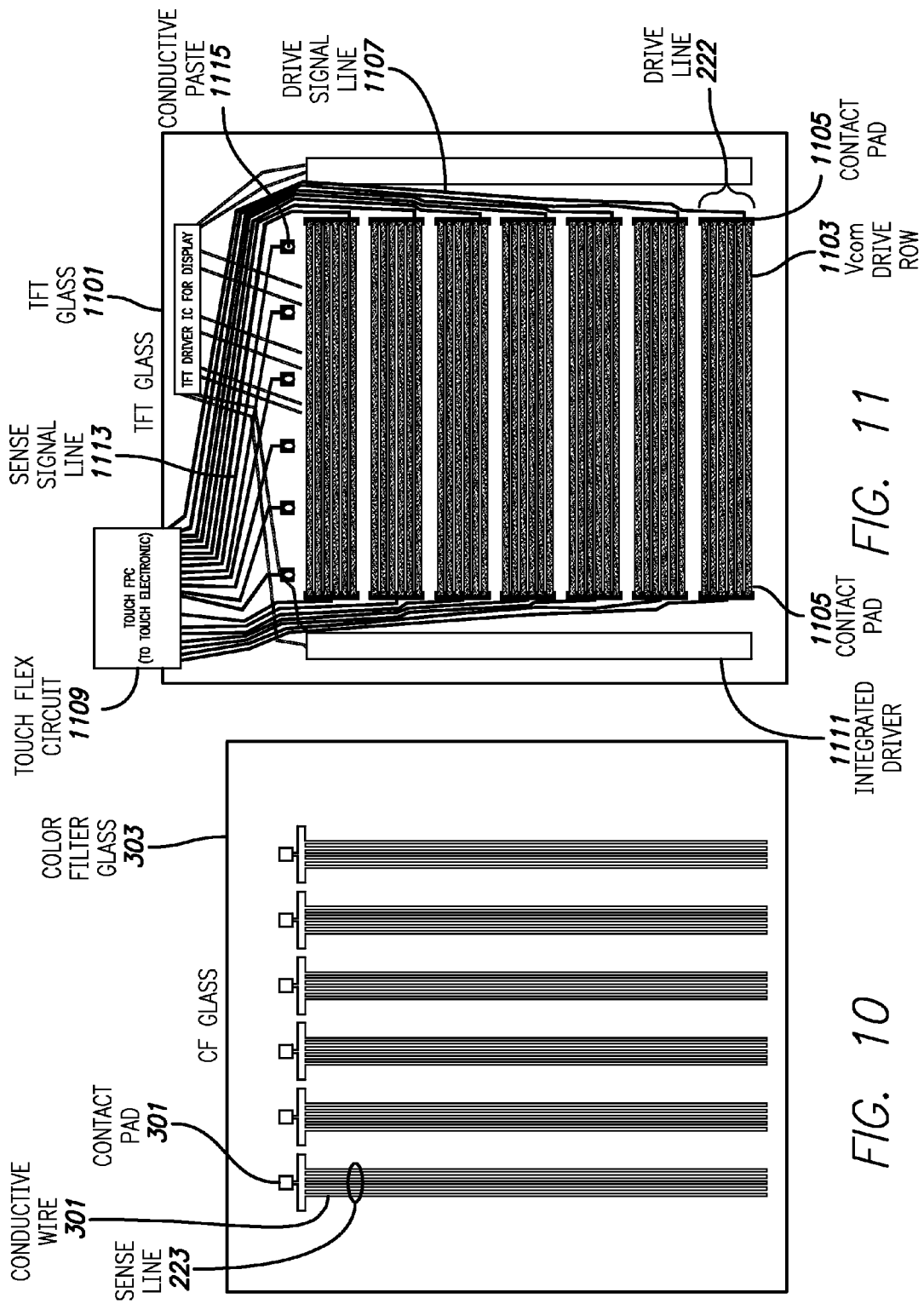

INTEGRATED TOUCH SCREENS

FIELD OF THE DISCLOSURE

This relates generally to integrated touch screens, and more particularly, to integrated touch screens including drive lines formed of grouped-together circuit elements of a thin film transistor layer and sense lines formed between a color filter layer and a material layer that modifies or generates light.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by integrating touch sensing circuitry into a display pixel stackup (i.e., the stacked material layers forming the display pixels).

SUMMARY

The following description includes examples of integrated touch screens including drive lines formed of grouped-together circuit elements of a thin film transistor layer and sense lines formed between a color filter layer and a material layer that modifies or generates light. In some examples, the touch screen can be an in-plane switching (IPS) liquid crystal display (LCD), fringe field switching (FFS), advanced fringe field switching (AFFS), etc. The common electrodes (Vcom) in the TFT layer can be grouped together during a touch sensing operation to form drive lines. Sense lines can be formed on an underside of a color filter glass, and a liquid crystal region can be disposed between the color filter glass and the TFT layer. Placing the sense lines on the underside of the color filter glass, i.e., within the display pixel cell, can provide a benefit of allowing the color filter glass to be thinned after the pixel cells have been assembled, for example.

BRIEF DESCRIPTION OF THE DRAWINGS

FIG. 10 includes an example configuration of a color filter glass including contact pads connected to sense lines according to embodiments of the disclosure.

FIG. 11 illustrates an example configuration of a TFT glass according to embodiments of the disclosure.

DETAILED DESCRIPTION

In the following description of example embodiments, reference is made to the accompanying drawings which form a part hereof, and in which it is shown by way of illustration specific embodiments in which embodiments of the disclosure can be practiced. It is to be understood that other embodiments can be used and structural changes can be made without departing from the scope of the embodiments of this disclosure.

The following description includes examples of integrated touch screens including drive lines formed of grouped-together circuit elements of a thin film transistor layer and sense lines formed between a color filter layer and a material layer that modifies or generates light. In some examples, the touch screen can be an in-plane switching (IPS) liquid crystal display (LCD), fringe field switching (FFS), advanced fringe field switching (AFFS), etc. The common electrodes (Vcom) in the TFT layer can be grouped together during a touch sensing operation to form drive lines. Sense lines can be formed on an underside of a color filter glass, and a liquid crystal region can be disposed between the color filter glass and the TFT layer. Placing the sense lines on the underside of the color filter glass, i.e., within the display pixel cell, can provide a benefit of allowing the color filter glass to be thinned after the pixel cells have been assembled, for example.

During a display operation, in which an image is displayed on the touch screen, the Vcom can serve as part of the display circuitry, for example, by carrying a common voltage to create, in conjunction with a pixel voltage on a pixel electrode, an electric field across the liquid crystal. During a touch sensing operation, the a stimulation signal can be applied to a group of Vcom that form a drive line. A sense signal based on the stimulation signal can be received by the sense lines on the underside of the color filter glass and processed by a touch processor to determine an amount and location of touch on the touch screen.

Figure 1C:
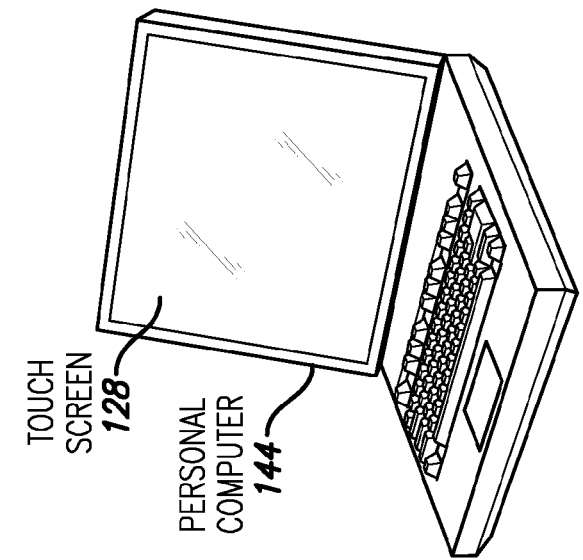
FIGS. 1A-1C illustrate an example mobile telephone, an example media player, and an example personal computer that each include an example touch screen according to embodiments of the disclosure.
Figure 1B:
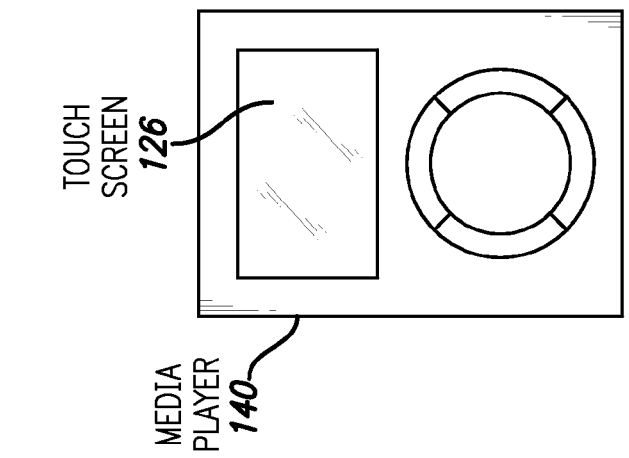
Figure 1A:
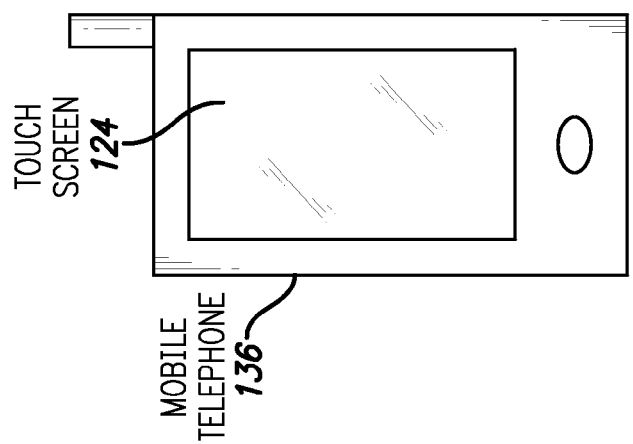

FIGS. 1A-1C show example systems in which a touch screen according to embodiments of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Touch screens 124, 126, and 128 can be based on mutual capacitance. A mutual capacitance based touch system can include, for example, drive regions and sense regions, such as drive lines and sense lines. For example, drive lines can be formed in rows while sense lines can be formed in columns (e.g., orthogonal). Touch pixels can be formed at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some embodiments, a touch screen can be multi-touch, single touch, projection scan, full-imaging multi-touch, capacitive touch, etc.

Figure 2:
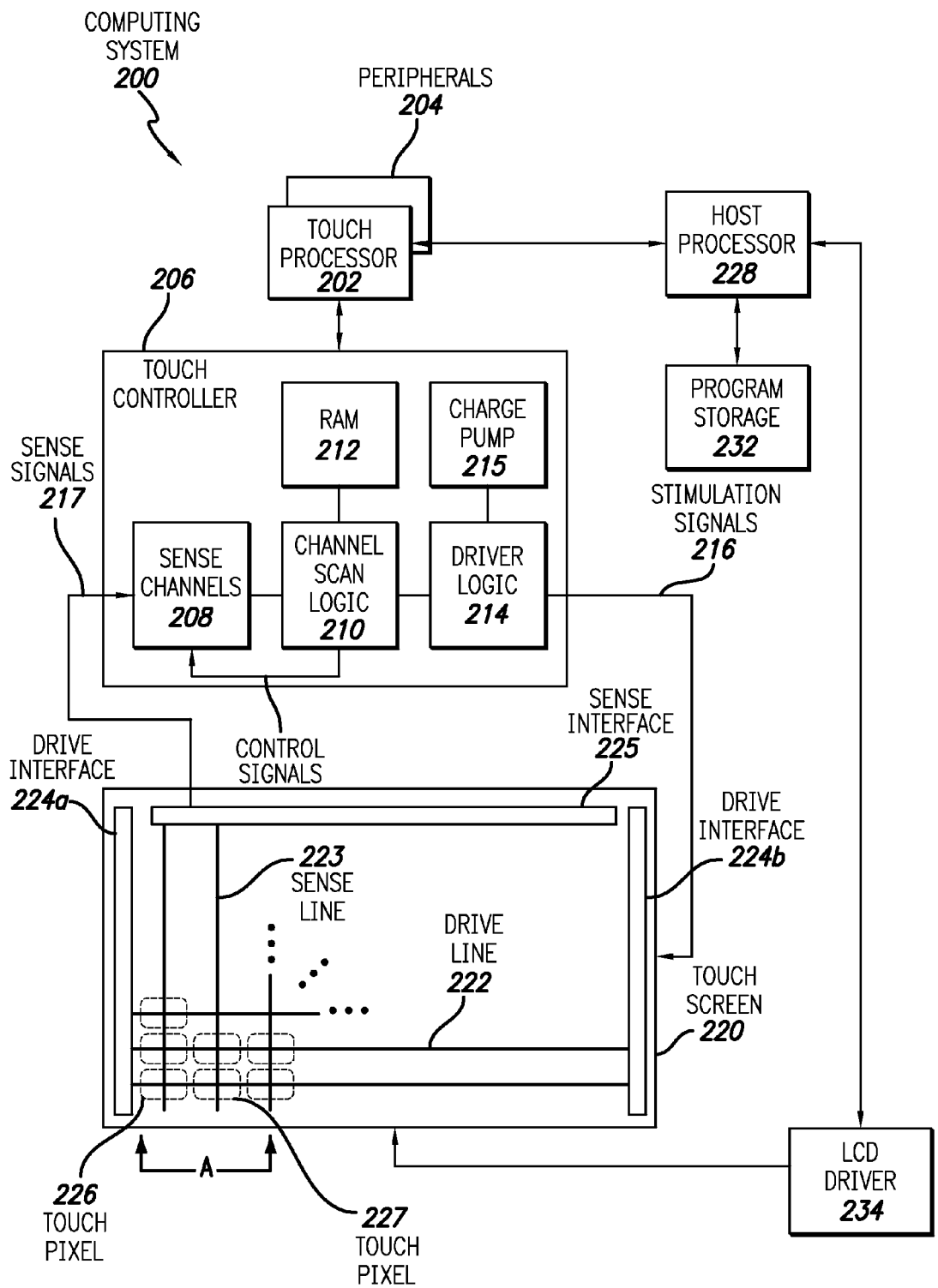
FIG. 2 is a block diagram of an example computing system that illustrates one implementation of an example touch screen according to embodiments of the disclosure.

FIG. 2 is a block diagram of an example computing system 200 that illustrates one implementation of an example touch screen 220 according to embodiments of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive lines of the touch sensing circuitry of touch screen 220, as described in more detail below. In some embodiments, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is a sometimes used herein to mean simply conductive pathways, as one skilled in the art will readily understand, and is not limited to elements that are strictly linear, but includes pathways that change direction, and includes pathways of different size, shape, materials, etc, and multiple electrically conductive circuit elements that can be electrically connected to form a single electrically conductive pathway. Drive lines 222 can be driven by stimulation signals 216 from driver logic 214 through drive interfaces 224a and 224b, and resulting sense signals 217 generated in sense lines 223 can be transmitted through a sense interface 225 to sense channels 208 (also referred to as an event detection and demodulation circuit) in touch controller 206. The stimulation signal may be an alternating current (AC) waveform. In this way, drive lines and sense lines can be part of the touch sensing circuitry that can interact to form capacitive sensing nodes, which can be thought of as touch picture elements (touch pixels), such as touch pixels 226 and 227.

This way of understanding can be particularly useful when touch screen 220 is viewed as capturing an "image" of touch. In other words, after touch controller 206 has determined an amount of touch detected at each touch pixel in the touch screen, the pattern of touch pixels in the touch screen at which a touch occurred can be thought of as an "image" of touch (e.g. a pattern of fingers touching the touch screen).

Structures and operations of various example embodiments of integrated touch screens will now be described with reference to FIGS. 3-15.

Figure 3:
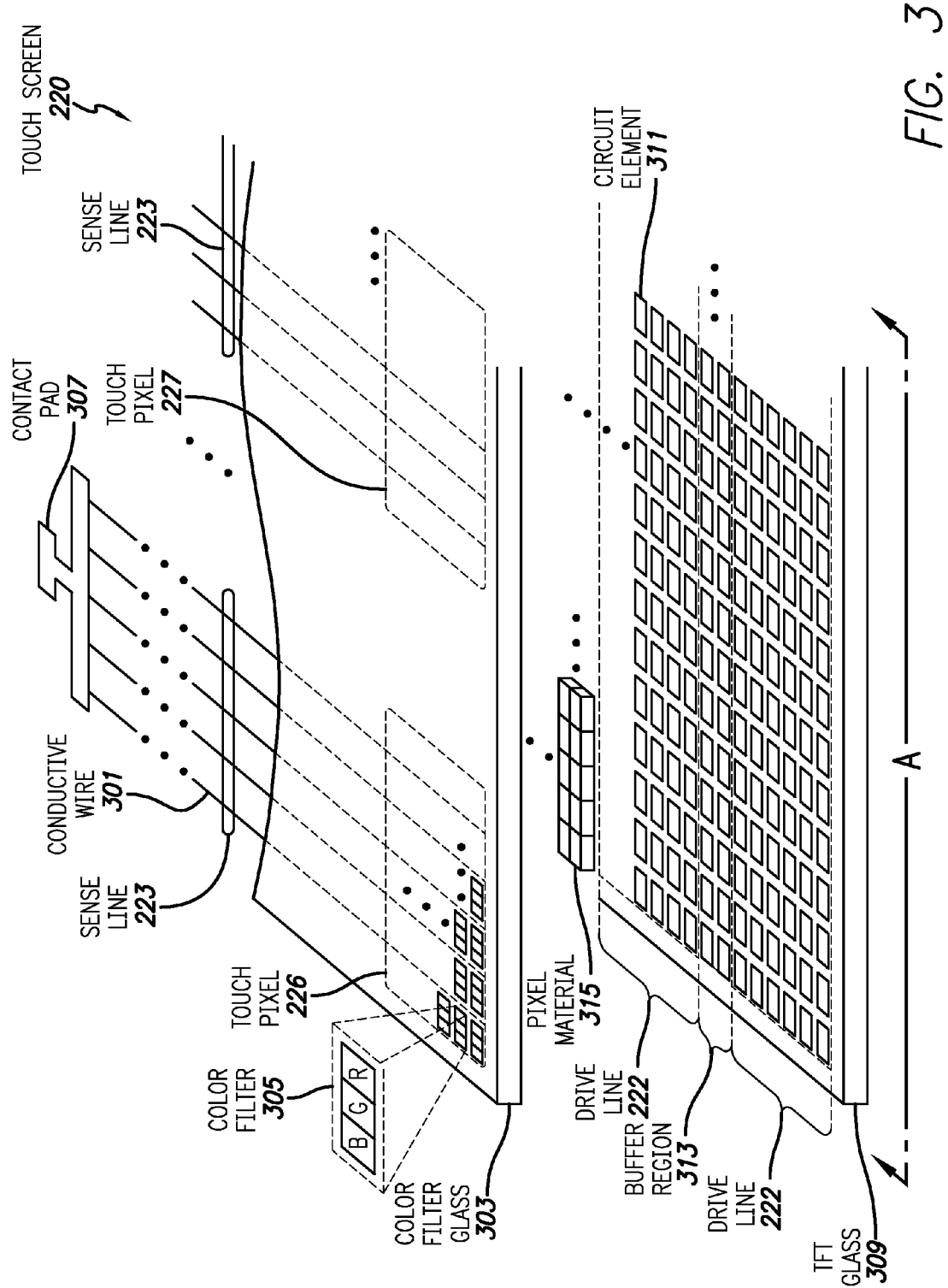
FIG. 3 illustrates example configurations of sense lines, drive lines, and other example structures of a touch screen according to embodiments of the disclosure.

FIG. 3 illustrates example embodiments of sense lines, drive lines, and other example structures of touch screen. FIG. 3 shows a more detailed view of a lower left hand portion of touch screen 220 along line "A" shown in FIG. 2. In the example embodiment shown in FIG. 3, each sense line 223 includes multiple conductive wires 301, e.g., five conductive wires in this example embodiment. Conductive wires 301 are disposed on the underside of a color filter glass 303, between the color filter glass and the TFT glass. The color filter glass 303 can include a plurality of color filters 305. In this example embodiment, color filters 305 each include three colors, blue (B), green (G), and red (R), such as in an RGB display. Each conductive wire 301 is positioned between two columns of color filters 305. In this example, the space between the columns of the color filters can be widened to accommodate the conductive wire. In the example shown, five conductive wires 301 of each sense line 223 can be connected to a contact pad 307 that conductively connects the conductive wires of the sense line and allows each group of five conductive wires to operate as a single sense line. Contact pads 307 can be electrically connected to, for example, sense channels 208 of touch controller 206 shown in FIG. 2, so that sense signals 217 received by each sense line 223 can be processed by the touch controller.

FIG. 3 also shows a TFT glass 309, on which can be formed circuit elements 311. Circuit elements 311 can be, for example, multi-function circuit elements that operate as part of the display circuitry of the touch screen and also as part of the touch sensing circuitry of the touch screen. In some embodiments, circuit elements 311 can be single-function circuit elements that operate only as part of the touch sensing system. In addition to circuit elements 311, other circuit elements (not shown) can be formed on TFT glass 309, such as transistors, capacitors, conductive vias, data lines, gate lines, etc. Circuit elements 311 and the other circuit elements formed on TFT glass 309 can operate together to perform various display functionality required for the type of display technology used by touch screen 220, as one skilled in the art would understand. The circuit elements can include, for example, elements that can exist in conventional LCD displays. It is noted that circuit elements are not limited to whole circuit components, such a whole capacitor, a whole transistor, etc., but can include portions of circuitry, such as only one of the two plates of a parallel plate capacitor.

Some of the circuit elements 311 can be electrically connected together such that the circuit elements 311 and their interconnections together form drive lines 222. Various example methods of connecting together circuit elements 311 to form drive lines 222 will be discussed in more detail in reference to FIGS. 8-9. Some of the circuit elements 311 that lie between drive lines 222 can serve as a buffer region 313. One purpose of the buffer region 313 can be to separate drive lines 222 from one another to reduce or to prevent cross talk and stray capacitance effects. Circuit elements 311 in buffer region 313 can, for example, be unconnected from drive lines 222. In various embodiments, some or all of the circuit elements 311 in buffer region 313 can be, for example, electrically connected to each other, electrically unconnected from each other, maintained at a fixed voltage during a touch sensing operation, maintained at a floating potential during a touch sensing operation, etc. The example configurations of sense lines 223 and drive lines 222 shown in FIG. 3 can be laid out as shown in FIG. 2 as an overlapping orthogonal grid to form touch pixels 226 and 227, for example. Although not illustrated in FIG. 3, it is understood that first and second polarizers can be provided, the first polarizer can be adjacent the TFT glass and the second polarizer can be adjacent the color filter glass such that the TFT glass and the color filter glass are disposed between the first and second polarizers.

FIG. 3 also shows a pixel material 315 disposed between TFT glass 309 and color filtered glass 303. Pixel material 315 is shown in FIG. 3 as separate volumn regions or cells above the circuit elements 311. For example, when the pixel material is a liquid crystal, these volumn regions or cells are meant to illustrate regions of the liquid crystal controlled by the electric field produced by the pixel electrode and common electrode of the volume region or cell under consideration. Pixel material 315 can be a material that, when operated on by the display circuitry of touch screen 220, can generate or control an amount, color, etc., of light produced by each display pixel. For example, in an LCD touch screen, pixel material 315 can be formed of liquid crystal, with each display pixel controlling a volumn region or cell of the liquid crystal. In this case, for example, various methods exist for operating liquid crystal in a display operation to control the amount of light emanating from each display pixel, e.g., applying an electric field in a particular direction depending on the type of LCD technology employed by the touch screen. In an in-plane switching (IPS), fringe field swithing (FFS), and advanced fringe field switching (AFFS) LCD displays, for example, electrical fields between pixel electrodes and common electrodes (Vcom) disposed on the same side of the liquid crystal can operate on the liquid crystal material to control the amount of light from a backlight that passes through the display pixel. In an OLED (organic light emitting diode) display, for example, pixel material 315 can be, for example, an organic material in each pixel that generates light when a voltage is applied across the material. One skilled in the art would understand that various pixel materials can be used, depending on the type of display technology of the touch screen.

Figure 3A:
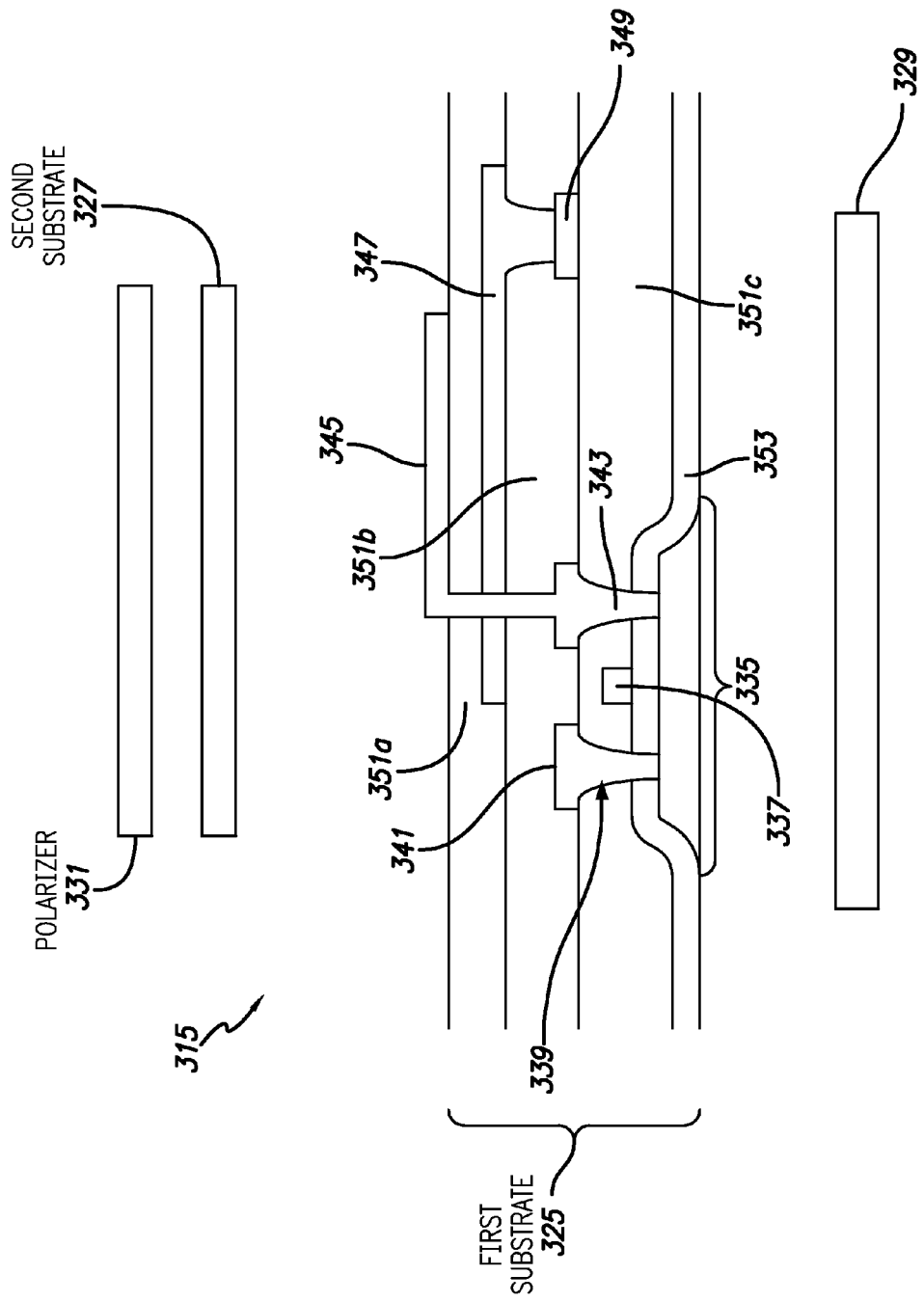
FIG. 3A illustrates an example display pixel stackup according to embodiments of the disclosure.

FIG. 3A illustrates an enlarged view of a display pixel (as for example, a paricular R, B, or G sub-pixel). As may be seen in FIG. 3A, there can be provided a first substrate 325 (such as the TFT glass 309 of FIG. 3), a second substrate 327 (such as the color filter glass 303 of FIG. 3), a first polarizer 329 and a second polarizer 331. The first polarizer 329 can be disposed adjacent the first substrate 325, and the second polarizer 331 can be disposed adjacent the second substrate 327. One display pixel of the first substrate 325 is shown greatly enlarged for purposes of illustration. A TFT 335 can have a gate 337, a source 339 connected to a data line 341, and a drain 343 connected to pixel electrode 345. Common electrode 347 can be disposed adjacent the pixel electrode 345 and can be connected to a common electrode conductive line 349. Layers of diectric material 351a, 351b and 351c can be disposed as shown in FIG. 3A to separate electrodes from one another. FIG. 3A also illustrates gate insulation layer 353. An electrical fringe field between the pixel electrode 345 and the common electrode 347 can control the pixel material disposed between the first and second substrates during the display operation in order to provide a display image.

Figure 4:
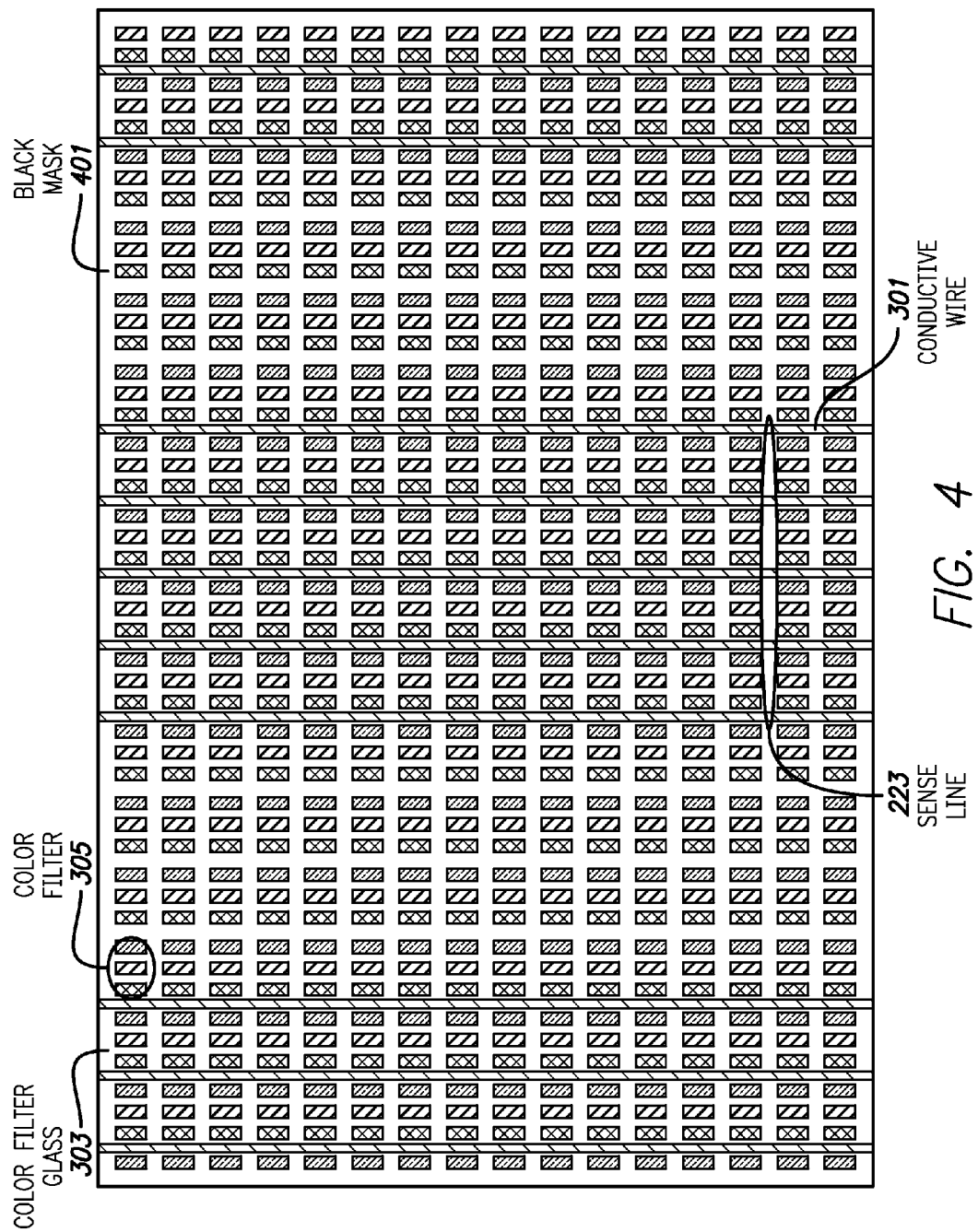
FIG. 4 illustrates a more detailed view of an example color filter glass including sense lines disposed on an underside of the color filter glass according to embodiments of the disclosure.

FIG. 4 illustrates a more detailed view of color filter glass 303. FIG. 4 includes color filters 305, conductive wires 301, which form sense lines 203. Conductive wires 301 can be, for example, metal lines such as aluminum, etc. In this regard conductive wires 301 can be positioned behind a black mask 401 so that the conductive wires are not visible to a user. Therefore conductive wires 301 need not be transparent conductors. However, in some example embodiments, conductive wires 301 can be transparent metal. Although in the example embodiment shown in FIG. 4 the spacing between the columns of color filters 305 can be widened to accommodate conductive wires 301, in some embodiments the spacing can be different, including equal spacing between the color filters.

Figure 5:
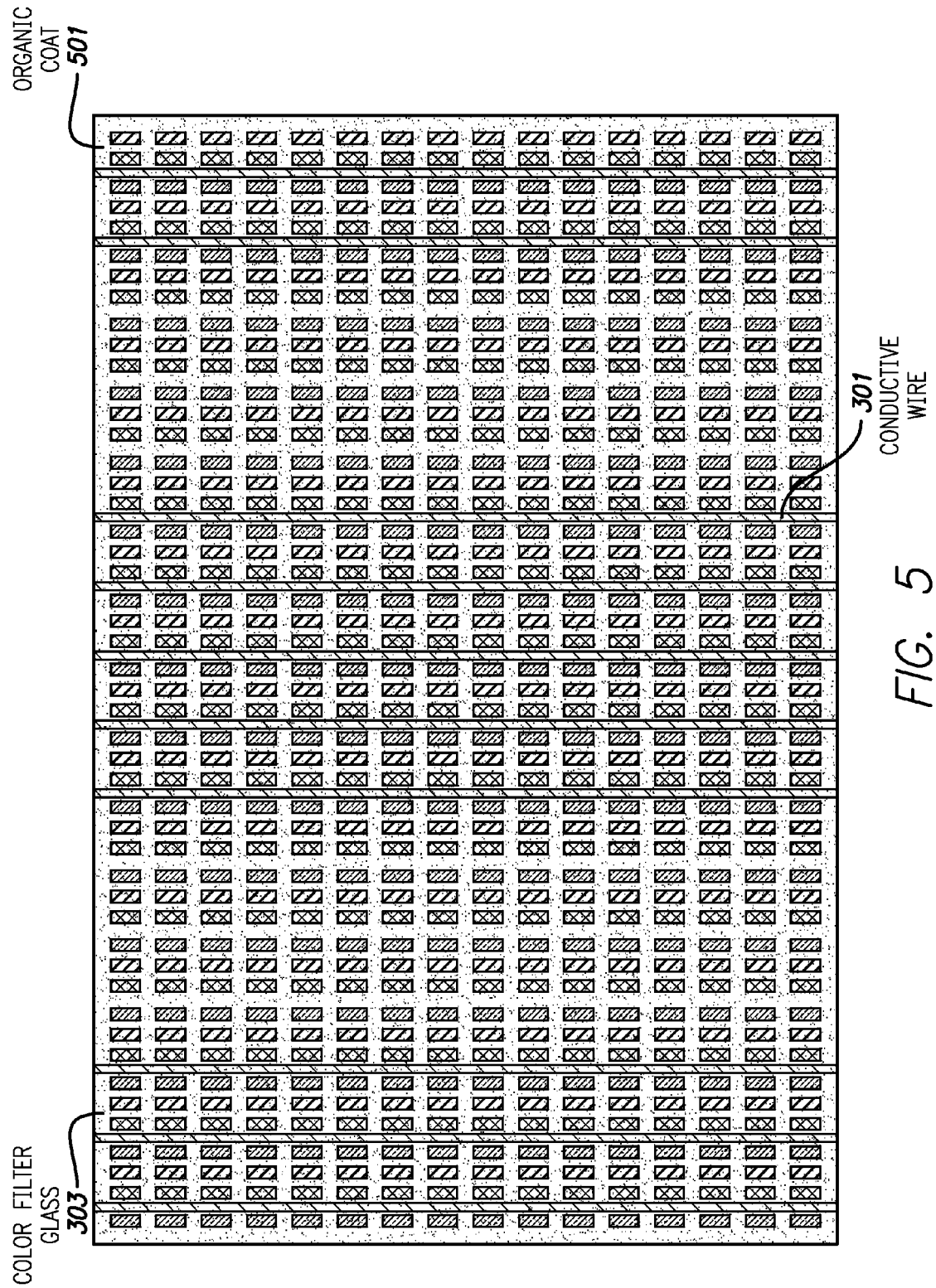
FIG. 5 illustrates an example color filter glass that includes an organic coat formed over conductive wires according to embodiments of the disclosure.

FIG. 5 illustrates an example embodiment that includes an organic coat 501 that has been formed over conductive wires 301. In other words, conductive wires 301 can be formed on the underside of color filter glass 303, and then organic coat 501 can be formed on conductive wires 301, such that the conductive wires are disposed between color filter glass 303 and organic coat 501. Organic coat 501 can be formed of a material that can protect the conductive wires from exposure to chemicals, from physical abrasion, etc.

Figure 6:
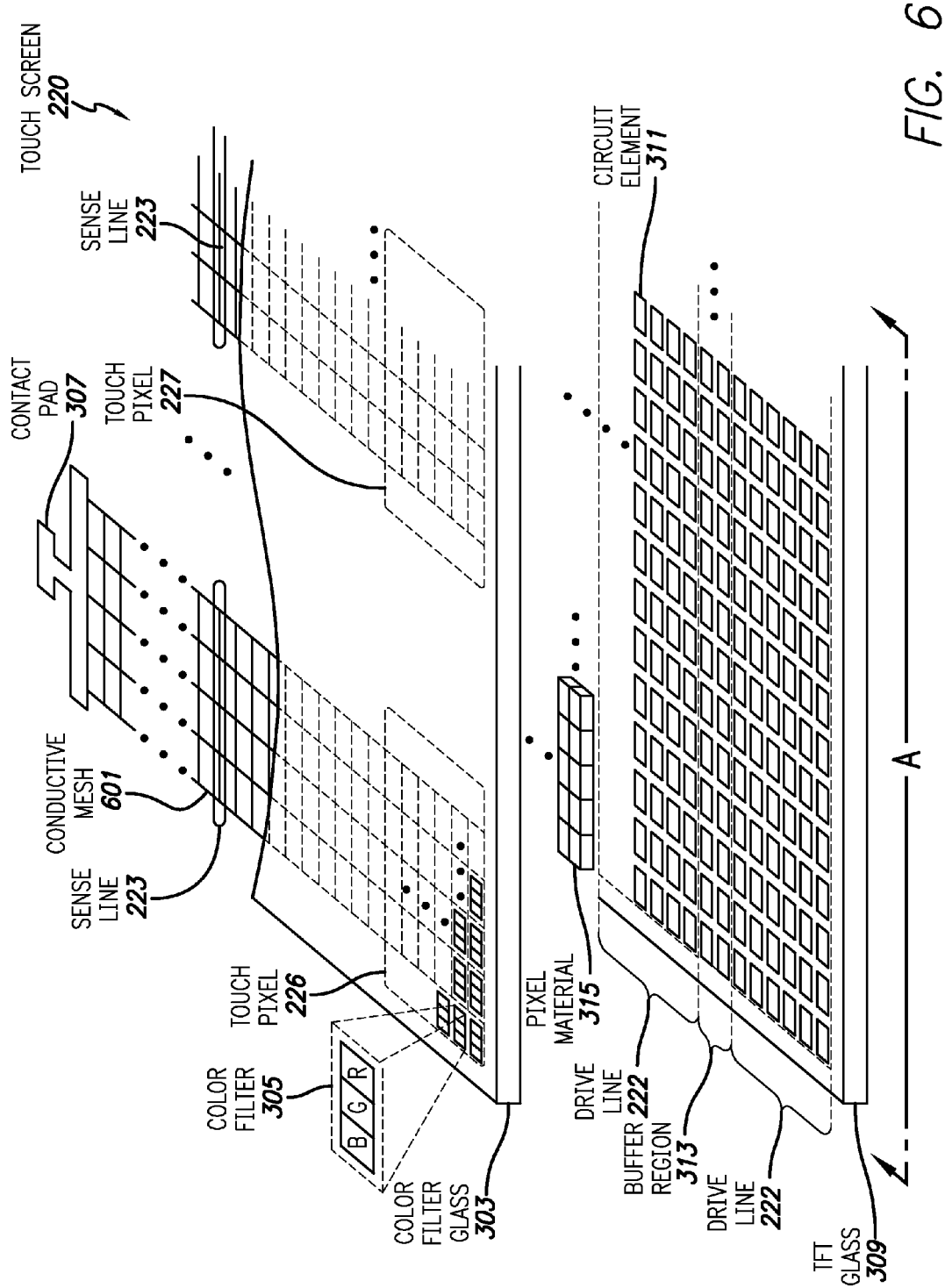
FIG. 6 illustrates other example configurations of sense lines, drive lines, and other example structures of a touch screen according to embodiments of the disclosure.

FIG. 6 illustrates another example embodiment showing another example configuration of sense lines 223. As in the example shown in FIG. 3, the example shown in FIG. 6 is a perspective view along line "A" shown in FIG. 2. In the example embodiment shown in FIG. 6, each of the sense lines 223 can include a conductive mesh 601. Conductive mesh 601 can be formed of, for example, metal wires, metal strips, etc., that are formed on the underside of color filter glass 303. Conductive mesh 601 can be, for example, a conductive orthogonal grid, the conductive lines of which are disposed between individual color filters 305.

Sense line 223, formed of conductive mesh 601, can be conductively connected to contact pad 307 such that a sense signal received by the sense line can be transmitted to touch controller 206 for processing. Similar to the previous embodiment, the portion of touch screen 220 shown in example embodiment in FIG. 6 includes drive lines 222 and buffer regions 313, each of which can be formed of circuit elements 311 that have been grouped together either operationally or physically to perform their respective functions. In a touch sensing operation, stimulation signals applied to drive lines 222 can allow touches to be sensed by sense lines 223 in the areas of various touch pixels, such as touch pixels 226 and 227. The example embodiment shown in FIG. 6 also includes pixel material 315, similar to the example embodiment shown in FIG. 3.

Figure 7:
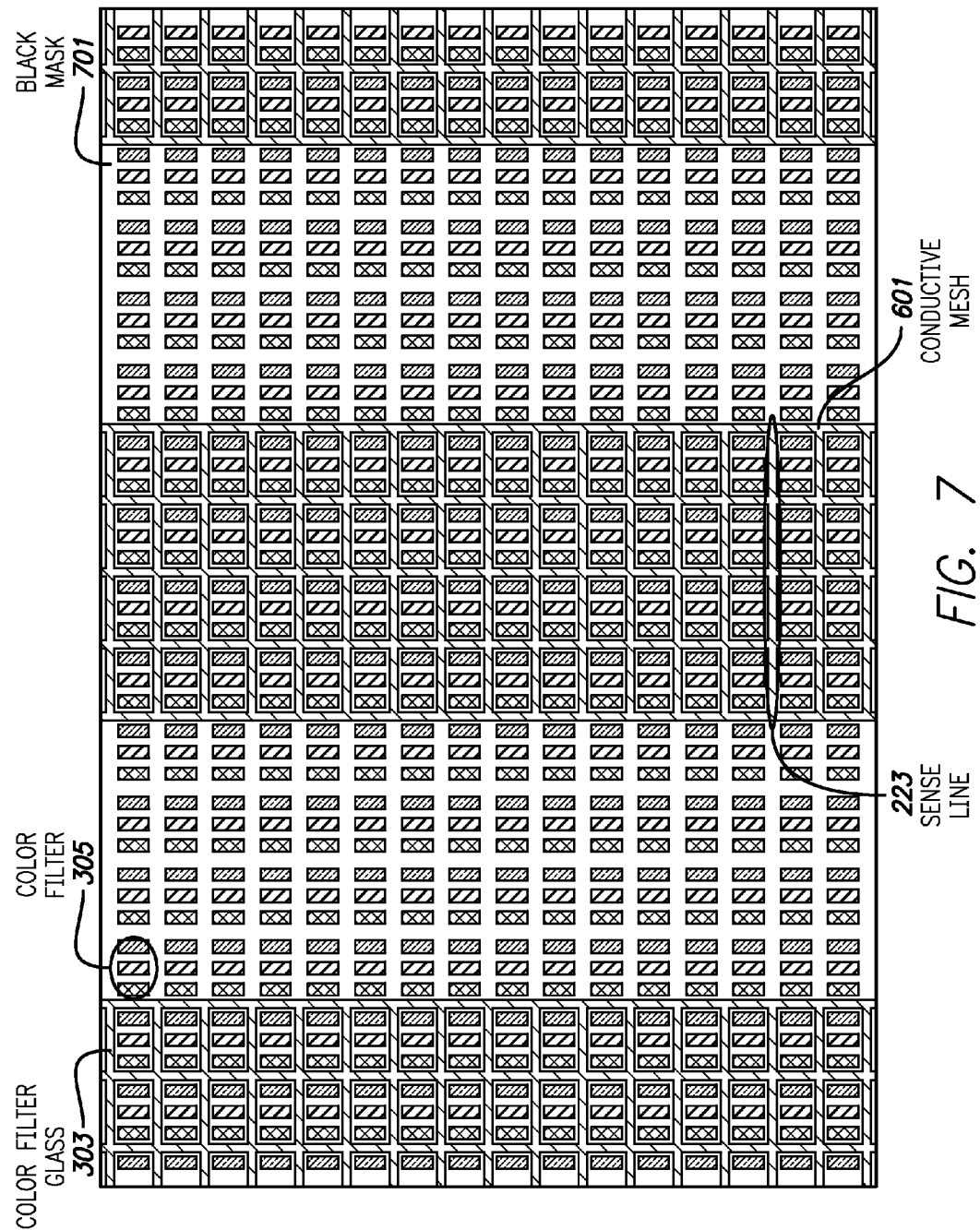
FIG. 7 illustrates a more detailed view of another example color filter glass including sense lines disposed on an underside of the color filter glass according to embodiments of the disclosure.

FIG. 7 illustrates a more detailed view of color filter glass 303 shown in the example embodiment FIG. 6. FIG. 7 includes color filters 305 and conductive mesh 601, which form sense lines 203. Conductive mesh 601 can be, for example, formed of non-transparent metal lines such as aluminum, etc. In this regard conductive mesh 601 can be positioned behind a black mask 701 so that the conductive mesh is not visible to a user. Therefore, in this embodiment, the conductive mesh 601 need not be made of transparent conductors. However, in some example embodiments, conductive mesh 601 can be transparent metal.

Figure 8:
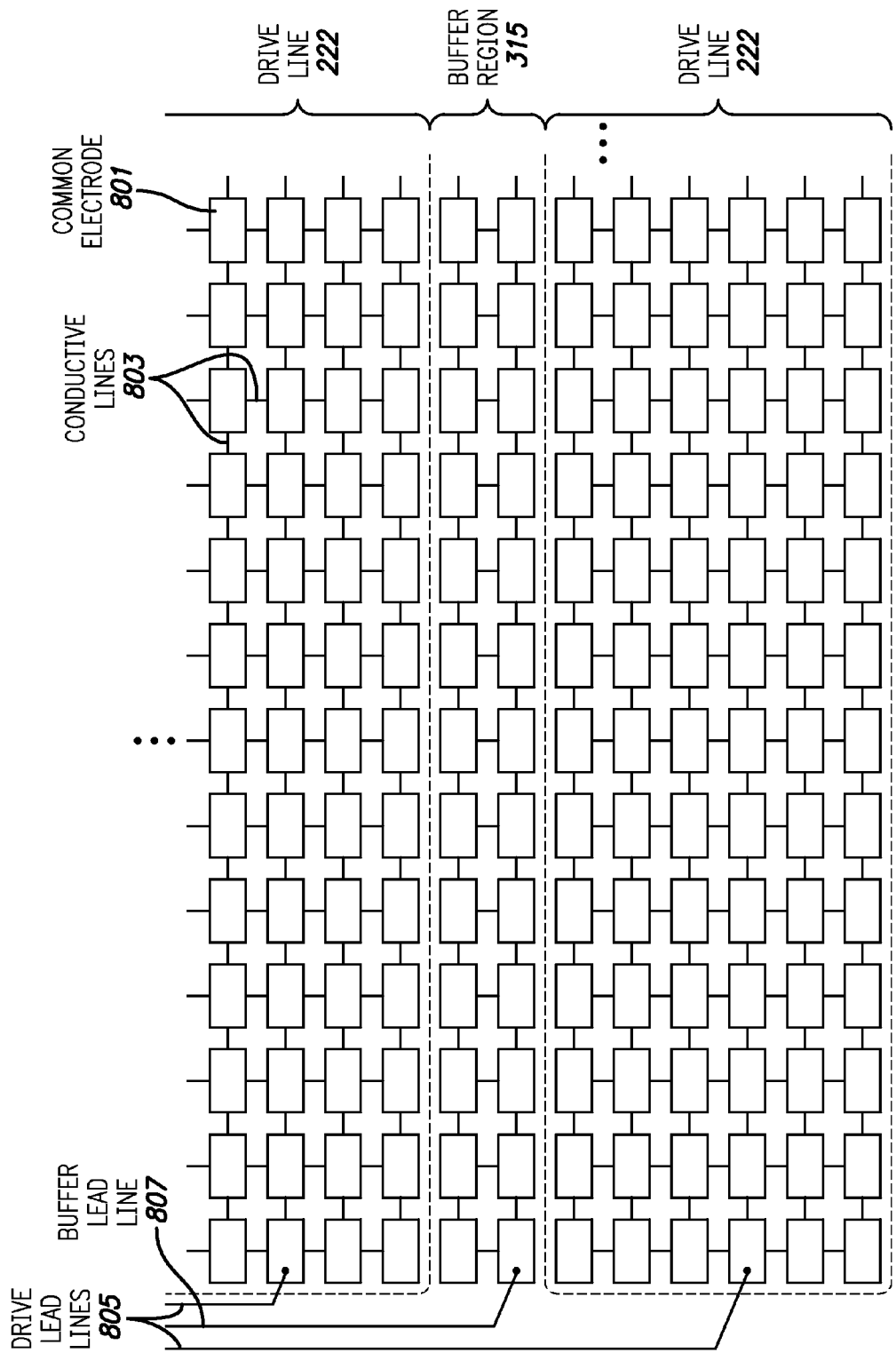
FIG. 8 illustrates an example configuration of drive lines including circuit elements of a TFT layer of a touch screen according to embodiments of the disclosure.

FIG. 8 illustrates a more detailed view of an example configuration of drive lines 222 and buffer regions 313 according to various embodiments. In this example embodiment, circuit elements 311 can include common electrodes 801. Common electrodes 801 can be operated as multi-function circuit elements that can operate as part of the display circuitry in a display operation and can operate as part of the touch sensing circuitry in a touch sensing operation of the touch screen. Common electrodes 801 can be electrically connected together with conductive lines 803, to form the required regions such as regions that operate as drive lines 222 and regions that operate as buffer regions 313. In this example embodiment, common electrodes functional region can be physically connected with fixed conductive lines. In other words, the common electrodes in each region can be permanently connected through the physical design of the touch screen. In other words, common electrodes 801 can be grouped together to form drive lines. Grouping multi-function circuit elements of display pixels can include operating the multi-function circuit elements of the display pixels together to perform a common function of the group. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Stimulation signals can be applied to drive lines 222 through drive lead lines 805. For example, drive lead lines can be electrically connected to driver logic 214, which can provide the stimulation signals during the touch sensing operation. Buffer region 313 can be connected to a buffer lead line 807, which can be connected to a buffer operator (not shown).

In the example shown in FIG. 8, each common electrode (Vcom) 801 can serve as a multi-function circuit element that can operate as display circuitry of the display system of touch screen 220 and can also operate as touch sensing circuitry of the touch sensing system. In this example, each common electrode 801 can operate as a common electrode of the display circuitry of the touch screen, and can also operate together when grouped with other common electrodes as touch sensing circuitry of the touch screen. For example, a group of common electrodes 801 can operate together as a part of a drive line of the touch sensing circuitry during the touch sensing operation. Other circuit elements of touch screen 220 can form part of the touch sensing circuitry by, for example, electrically connecting together common electrodes 801 of a region, switching electrical connections, etc. Each display pixel can include a common electrode 801, which can be a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some embodiments, some of the circuit elements in the display pixel stackups can be multi-function circuit elements and other circuit elements may be single-function circuit elements. In other embodiments, all of the circuit elements of the display pixel stackups may be single-function circuit elements.

Figure 9:
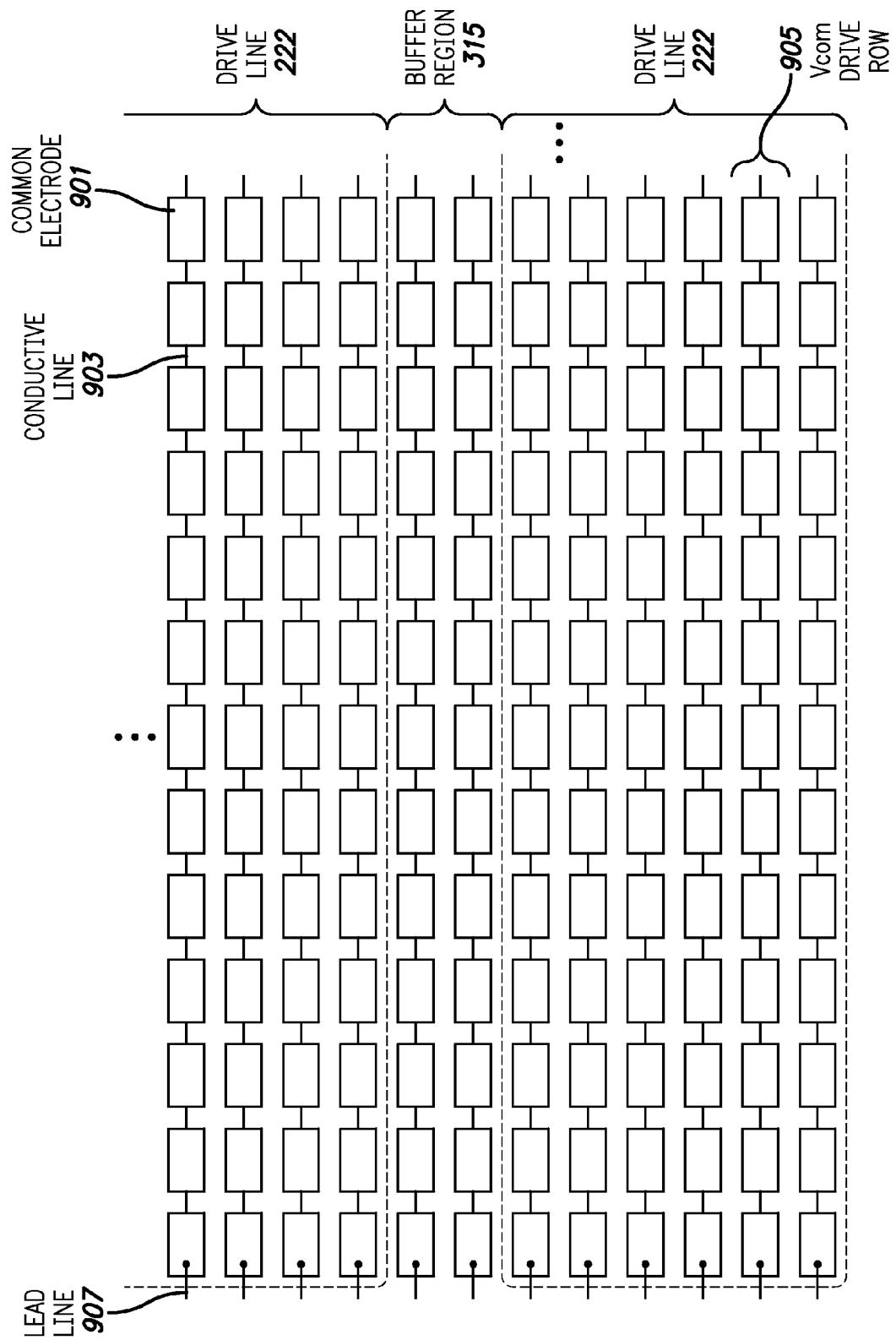
FIG. 9 illustrates another example configuration of drive lines including circuit elements of a TFT layer of a touch screen according to embodiments of the disclosure.

In the embodiment shown in FIG. 9, the circuit elements used to form drive lines, Vcom 901 in this example, can be physically connected together on the TFT glass through conductive lines 903 to form individual rows of connected together Vcom 901. The individual rows of Vcom, i.e., Vcom drive rows 905, can be connected together with other Vcom drive rows in the periphery using contact pads 907. In this example, each drive line 222 can be formed through fixed electrical connections.

Figure 9A:
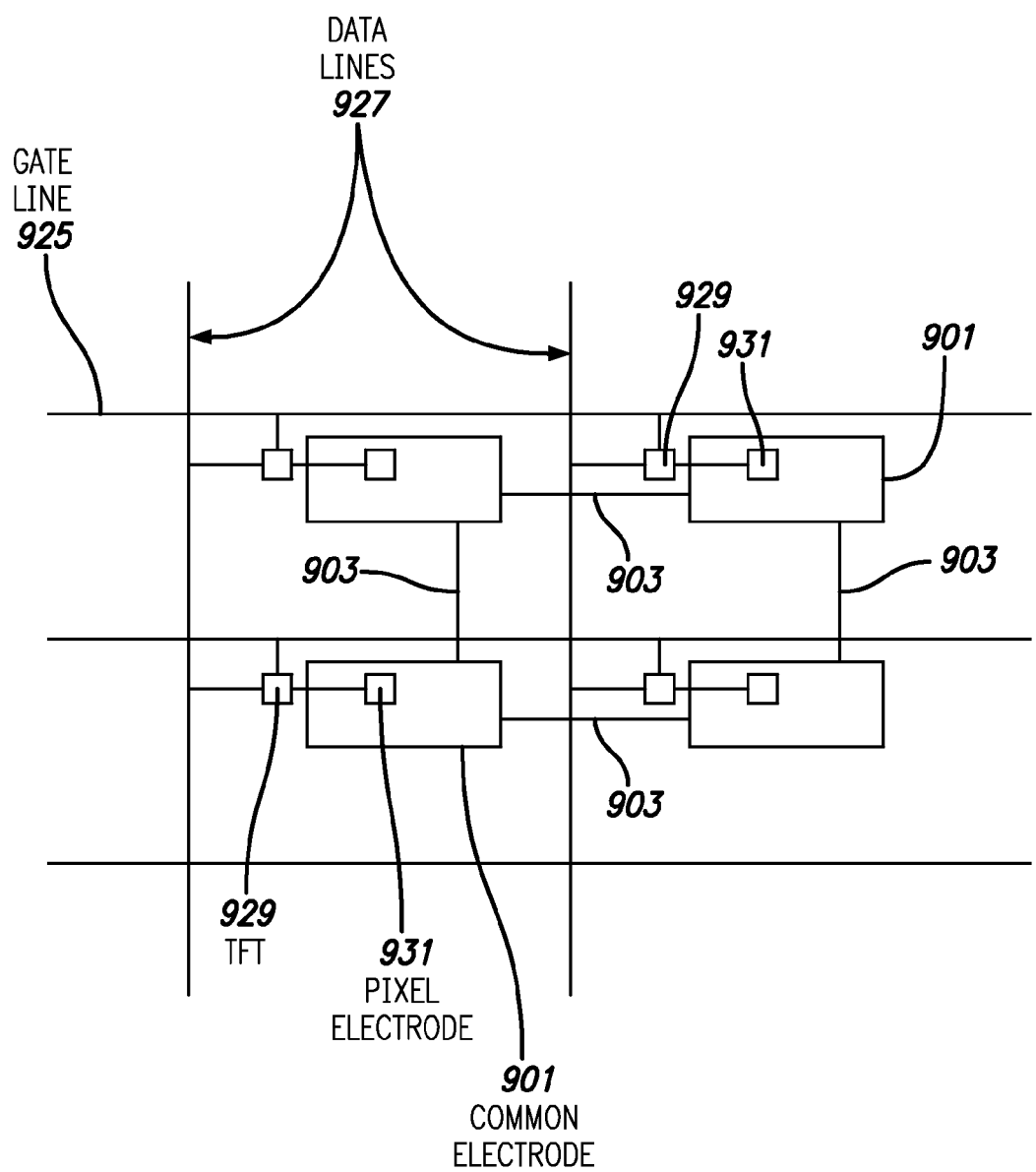
FIG. 9A illustrates an example circuit of a TFT substrate according to embodiments of the disclosure.

FIG. 9A illustrates a more detailed view of the of the TFT glass substrate previously illustrated in FIGS. 3, 6, 8 and 9. It is understood that the pixel electrodes, gate lines, data lines, TFT elements, and common electrode conductive lines connecting together the common electrodes are also present in FIGS. 3, 6, 8 and 9, but have been omitted for simplicity of illustration. Thus, as seen in FIG. 9A, gate lines 925 extend in a row (horizontal) direction and data lines 927 extend in a column (vertical) direction. The gate lines can be connected to gates of transistors 929 (for example, thin film transistors, TFTs) and control (e.g., turn on) these transistors to permit data from the data lines 927 to be applied to pixel electrodes 931 during a display operation. During the display operation, common electrodes 901 can be held at a preset voltage. FIG. 9A also shows conductive lines 903 interconnecting common electrodes 901 along the row and column directions. An electrical field can be formed by the difference in voltage between pixel electrode 931 and its corresponding common electrode 901 and this electric field can control the pixel material disposed above the first substrate (disposed between the first and second substrates). A pixel can be formed at each crossing of gate line 925 and data line 927 and comprises the pixel electrode 931 and its corresponding common electrode 901.

FIGS. 10 and 11 illustrate an example color filter glass design and an example TFT design, respectively, according to various embodiments. FIG. 10 includes an example configuration of multiple sense lines 223, each including multiple conductive wires such as conductive wires 301, connected to multiple contact pads, such as contact pad 311. For the sake of clarity, individual color filters are not shown in FIG. 10 In this example embodiment, conductive wires 301 and contact pads 307 can be formed on color filter glass 303 by, for example, physical vapor deposition (PVD).

FIG. 11 illustrates an example TFT glass according to various example embodiments. TFT glass 1101 can include various touch sensing circuitry and display circuitry. Touch sensing circuitry can include, for example, drive lines 222. In this example embodiment, each drive line 222 can include multiple Vcom drive rows 1103. In this example embodiment, each Vcom drive row 1103 in a drive line 222 can be connected to a single conductive contact pad 1105 on the left side of the TFT glass, and connected to a single contact pad 1105 on the right side of TFT glass. Contact pads 1105 can be connected through drive signal lines 1107 to touch controller 206 (FIG. 2) through a touch flex circuit 1109. In this way, for example, multiple Vcom drive rows 1103 can be driven together as a single drive line 222 during a touch sensing operation. TFT glass 1101 can also include integrated drivers 1111 that can drive the display circuitry, for example, using various display circuit elements such as gate lines, data lines, etc. Touch flex circuit 1109 can also be connected to sense signal lines 1113, which can be connected to contact pads 307 on the color filter glass through conductive paste 1115.

Figure 12:
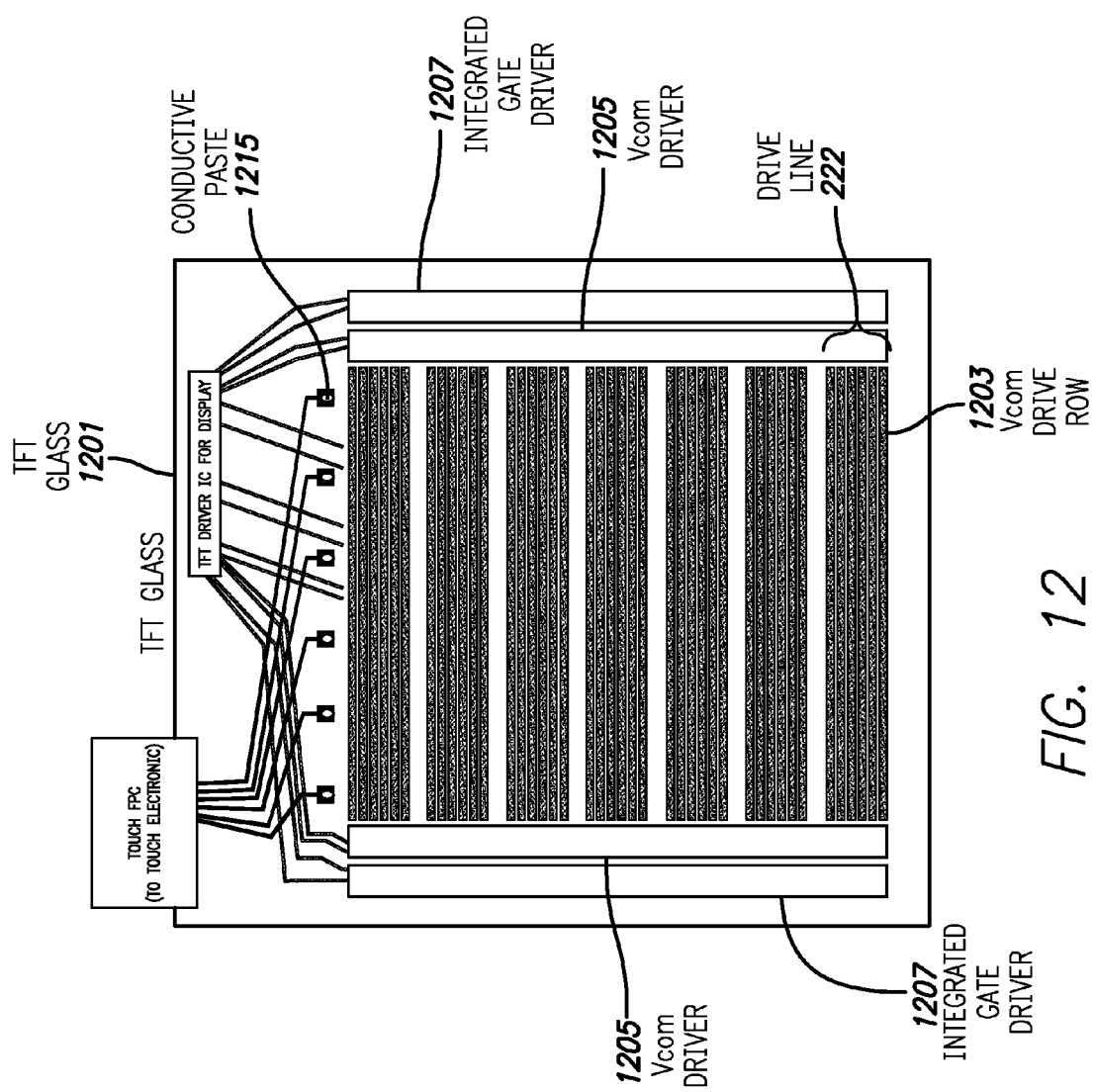
FIG. 12 illustrates another example configuration of a TFT glass according to embodiments of the disclosure.

FIG. 12 illustrates another example TFT glass design. FIG. 12 shows a TFT glass 1201 in which individual rows of Vcom are electrically connected together to form Vcom drive rows 1203. In other words, similar to the previous embodiment, each Vcom circuit element in Vcom drive row 1203 is permanently connected to the other Vcom in the drive row. However, in the example embodiment shown in FIG. 12, each individual Vcom drive row 1203 can be connected to a Vcom driver 1205 in the periphery of TFT glass 1201. Vcom driver 1205 can operate the Vcom drive rows 1203 in each drive line 222 to generate the same stimulation signals on each individual Vcom drive row 1203 of each drive line 222 during a touch sensing operation. In other words, a first stimulation signal can be applied to a first group of individual rows of Vcom, and a second stimulation signal can be applied to a second group of individual rows of Vcom. In this way, for example, a group of multiple Vcom drive rows 1203 can be operated together as a single drive line 222 even though the individual Vcom drive rows themselves are not connected to each other through fixed electrical connections.

Likewise, during a display operation of the touch screen, integrated gate drivers 1207 can operate the individual Vcom drive rows 1203 as part of the display circuitry to display an image on the touch screen. Therefore, in this example embodiment, the individual Vcom drive rows 1203 can be grouped together or operated individually as needed depending on the operation of the touch screen.

Figure 13:
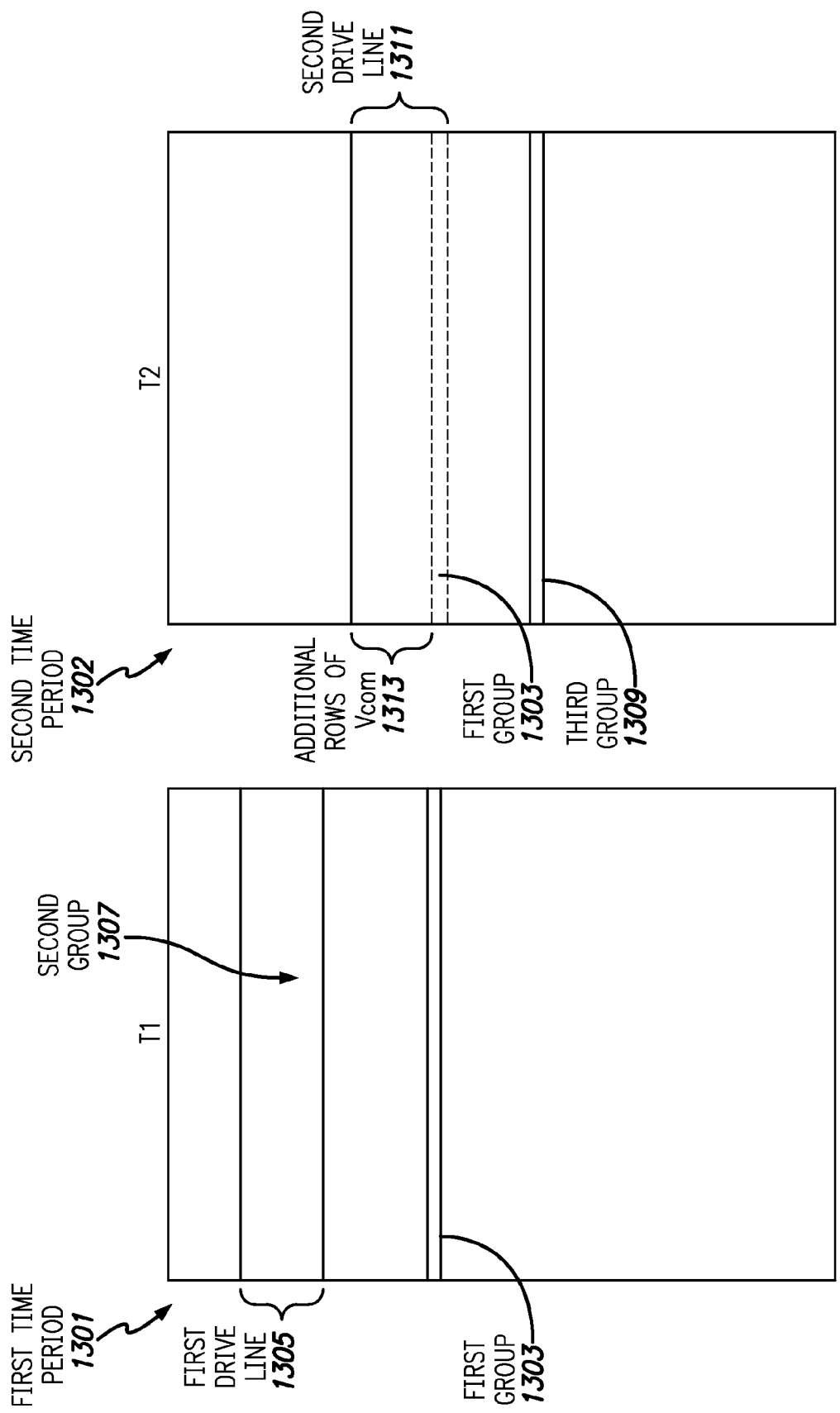
FIG. 13 illustrates an example method of driving circuit elements of a touch screen in a display operation and in a touch sensing operation according to embodiments of the disclosure.

FIG. 13 illustrates an example method of driving the circuit elements of the touch screen in the display operation and in the touch sensing operation. This example method can apply to an operation of a touch screen including the design of TFT glass 1201 of FIG. 12, for example. In this example embodiment, the display operation in which an image is displayed and the touch sensing operation in which touch is sensed can occur concurrently by operating different portions of the touch screen differently, that is, one group of circuit elements can be operated as display circuitry to display an image while, at the same time, another group of the circuit elements can be operated as touch sensing circuitry to sense a touch.

In a first time period 1301, integrated gate driver 1207, along with other display circuitry, can update a first group 1303 of circuit elements, e.g., an individual row of display pixels, to display a line of an image on the touch screen. For example, integrated gate driver 1207 can apply a common voltage to the Vcom in the first row of display pixels. Concurrently, in first time period 1301, Vcom driver 1205 can apply a stimulation signal to a first drive line 1305 that includes a second group 1307 of the circuit elements. Applying the stimulation signal can include, for example, applying the same stimulation signal to each of the individual Vcom drive rows 1203 in the first drive line 222. Because the image scanning row currently being scanned by integrated gate driver 1207 is not located in first drive line 1305, the Vcom drive rows 1203 being used for updating the displayed image do not overlap with the Vcom drive rows 1203 used for touch sensing as a drive line.

A second time period 1302 shows a third group 1309 of circuit elements can be operated as display circuitry, e.g., integrated gate driver 1207 can apply a common voltage to the Vcom in a third row of display pixels. The common voltage applied to the Vcom in the third row can be, for example, of an opposite polarity to the common voltage applied to the Vcom in the first row of display pixels. Concurrently, in second time period 1302, Vcom driver 1205 can apply a stimulation signal to a second drive line 1311 that includes first group 1303 and additional rows of Vcom 1313. In this way, for example, display operation and touch sensing operation can occur concurrently in an integrated touch screen.

In the example driving method shown in FIG. 13, display updating can be done on a row by row basis for individual Vcom drive rows 1203. In some embodiments, integrated gate driver 1207 can change the Vcom polarity on a row by row basis as well. For example, for each row of display pixel integrated gate driver 1207 can operate to change the polarity of Vcom, switch the gates of the row of display pixels to an "on" state, write data into each display pixel, and switch the gates to an "off" state. When different rows of Vcom are operated to perform touch sensing concurrently with display updating, as in this example embodiment, it is noted that in the touch sensing groups of circuit elements no data is being written into the display pixels in the rows of pixels in the drive line because the gate lines of these rows of display pixels are in the "off" state.

Figure 14:
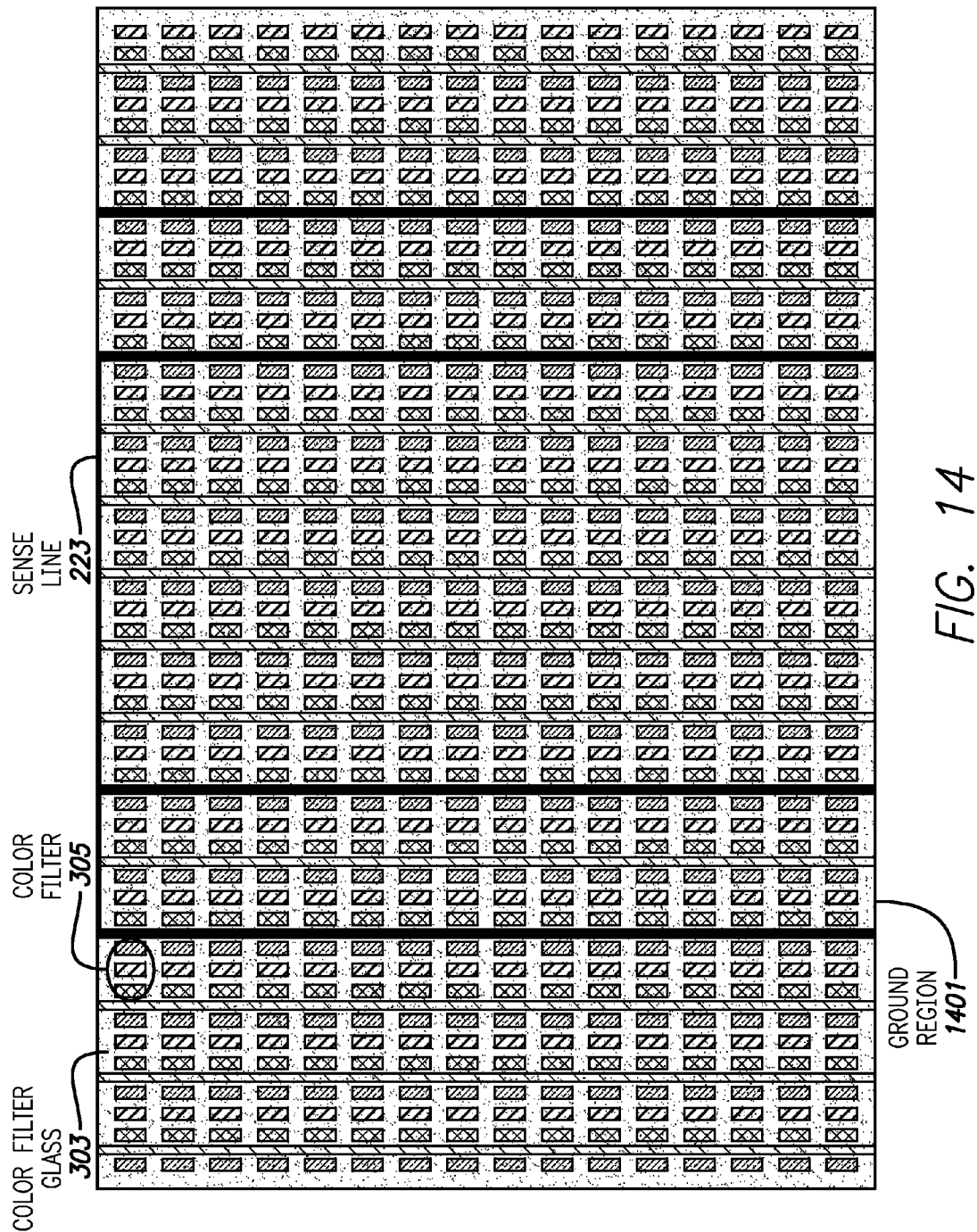
FIG. 14 illustrates another example configuration of a color filter glass according to embodiments of the disclosure.

FIG. 14 illustrates another example embodiment of sense lines 223. FIG. 14 illustrates a color filter glass 303 that includes sense lines 223 formed of a transparent conductor, such as indium tin oxide (ITO), on the underside of color filter glass 303. The ITO can be deposited on the underside of color filter glass 303 to cover a contiguous area including covering color filters 305. FIG. 14 also illustrates ground regions 1401 between sense lines 223. Ground regions 1401 can be formed of transparent conductor, such as ITO formed on the underside of color filter glass 303 and electrically separated from the sense lines on either side of each sense line. Ground regions 1401 can be connected to, for example, a ground or virtual ground in the periphery of the panel. Positioning ground regions between sense regions can help reduce interference in some embodiments.

Figure 15:
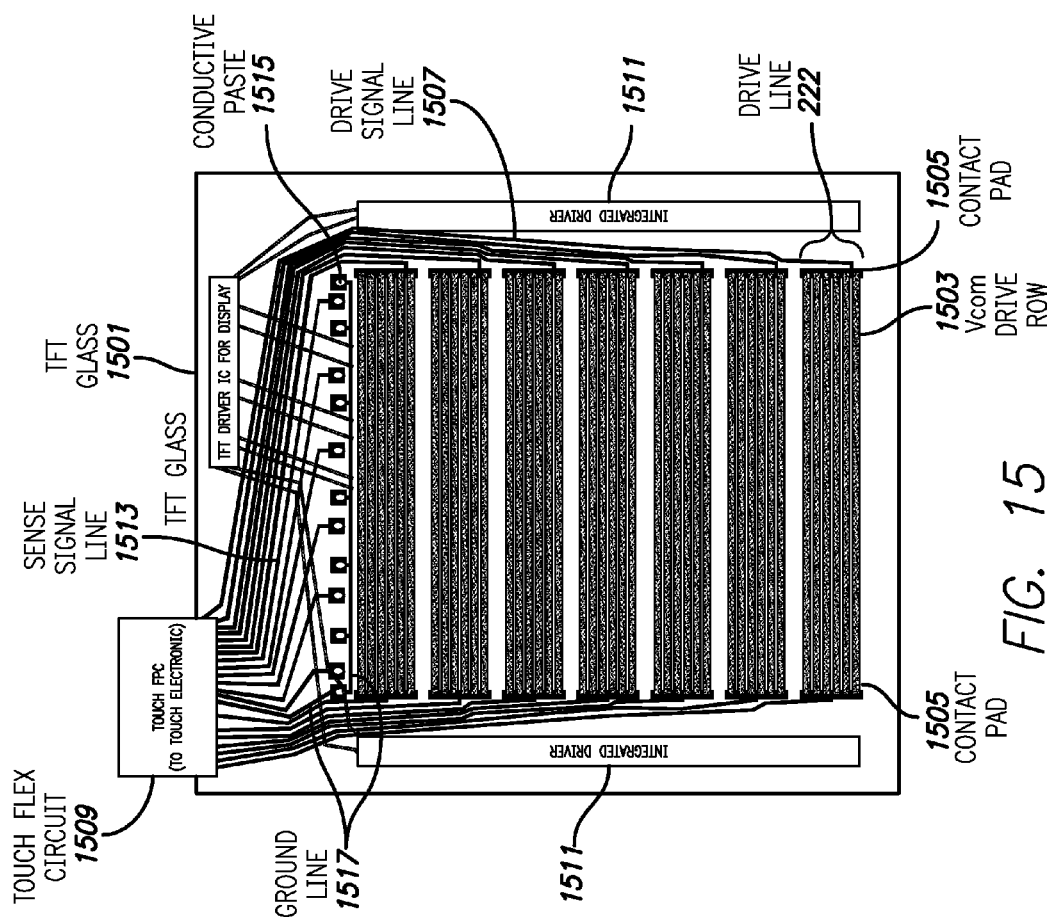
FIG. 15 illustrates another example configuration of a TFT glass according to embodiments of the disclosure.

FIG. 15 illustrates an example TFT glass design, TFT glass 1501. In this example, TFT glass 1501 can include various touch sensing circuitry and display circuitry. Touch sensing circuitry can include, for example, drive lines 222. In this example embodiment, each drive line 222 can include multiple Vcom drive rows 1503. In this example embodiment, each Vcom drive row 1503 in a drive line 222 can be connected to a single conductive contact pad 1505 on the left side of the TFT glass, and connected to a single contact pad 1105 on the right side of TFT glass. Contact pads 1505 can be connected through drive signal lines 1507 to touch controller 206 through a touch flex circuit 1509. In this way, for example, multiple Vcom drive rows 1503 can be driven together as a single drive line 222 during a touch sensing operation. TFT glass 1501 can also include integrated drivers 1511 that can drive the display circuitry, for example, using various display circuit elements such as gate lines, data lines, etc. Touch flex circuit 1509 can also be connected to sense signal lines 1513, which can be connected to contact pads 307 on the color filter glass through conductive paste 1515.

In FIGS. 3, 6, 8 and 9, each row of display pixels is illustrated as having a separate common electrode for each display pixel. These common electrodes (for example, circuit elements 311 of FIGS. 3 and 6, common electrode 801 of FIG. 8, and common electrode 901 of FIG. 9) may however, not be physically distinct and separate structures corresponding to each pixel electrode. In some embodiments the common electrodes that are electrically connected together across a particular row, as for example, Vcom drive row 905 of FIG. 9, may be formed by a single, continuous layer of conductive material, e.g., ITO. Further, a single continuous layer of conductive material (ITO) may be used for an entire drive line 222 such as in FIG. 8 where the illustrated common electrodes within each drive line 222 are electrically connected together along both rows (first direction) and columns (second direction, perpendicular to the first direction).

In addition, although example embodiments herein may describe the display circuitry as operating during a display operation, and describe the touch sensing circuitry as operating during a touch sensing operation, it should be understood that a display operation and a touch sensing operation may be operated at the same time, e.g., partially or completely overlap, or the display operation and touch phase may operate at different times. Also, although example embodiments herein describe certain circuit elements as being multi-function and other circuit elements as being single-function, it should be understood that the circuit elements are not limited to the particular functionality in other embodiments. In other words, a circuit element that is described in one example embodiment herein as a single-function circuit element may be configured as a multi-function circuit element in other embodiments, and vice versa.

Although embodiments of this disclosure have been fully described with reference to the accompanying drawings, it is to be noted that various changes and modifications including, but not limited to, combining features of different embodiments, omitting a feature or features, etc., as will be apparent to those skilled in the art in light of the present description and figures.

For example, one or more of the functions of computing system 200 described above can be performed by firmware stored in memory (e.g. one of the peripherals 204 in FIG. 2) and executed by touch processor 202, or stored in program storage 232 and executed by host processor 228. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Example embodiments may be described herein with reference to a Cartesian coordinate system in which the x-direction and the y-direction can be equated to the horizontal direction and the vertical direction, respectively. However, one skilled in the art will understand that reference to a particular coordinate system is simply for the purpose of clarity, and does not limit the direction of the elements to a particular direction or a particular coordinate system. Furthermore, although specific materials and types of materials may be included in the descriptions of example embodiments, one skilled in the art will understand that other materials that achieve the same function can be used. For example, it should be understood that a "metal layer" as described in the examples below can be a layer of any electrically conductive material.

In some embodiments, the drive lines and/or sense lines can be formed of other elements including, for example other elements already existing in typical LCD displays (e.g., other electrodes, conductive and/or semiconductive layers, metal lines that would also function as circuit elements in a typical LCD display, for example, carry signals, store voltages, etc.), other elements formed in an LCD stackup that are not typical LCD stackup elements (e.g., other metal lines, plates, whose function would be substantially for the touch sensing system of the touch screen), and elements formed outside of the LCD stackup (e.g., such as external substantially transparent conductive plates, wires, and other elements). For example, part of the touch sensing system can include elements similar to known touch panel overlays.

Although various embodiments are described with respect to display pixels, one skilled in the art would understand that the term display pixels can be used interchangeably with the term display sub-pixels in embodiments in which display pixels are divided into sub-pixels. For example, some embodiments directed to RGB displays can include display pixels divided into red, green, and blue sub-pixels. In other words, in some embodiments, each sub-pixel can be a red (R), green (G), or blue (B) sub-pixel, with the combination of all three R, G and B sub-pixels forming one color display pixel. One skilled in the art would understand that other types of touch screen could be used. For example, in some embodiments, a sub-pixel may be based on other colors of light or other wavelengths of electromagnetic radiation (e.g., infrared) or may be based on a monochromatic configuration, in which each structure shown in the figures as a sub-pixel can be a pixel of a single color.

What is claimed is:

1. A method of operating an touch screen including a plurality of circuit elements, dedicated sense lines disposed between a pixel material and a color filter layer, and drive lines disposed on a TFT substrate, the method comprising:
    operating a first portion of a group of the circuit elements as display circuitry by applying preset voltages to common electrodes of the first portion of the group of circuit elements disposed on the TFT substrate in a first display operation that displays an image on the touch screen during a first time period; and
    operating a second portion of the group of the circuit elements distinct from and non-overlapping with the first portion of the group of circuit elements, as touch sensing circuitry in a first touch sensing operation by
        applying stimulation signals along the drive lines to common electrodes of the second portion of the group of circuit elements disposed on the TFT substrate during the first time period; and
        transmitting sense signals along the dedicated sense lines disposed between the pixel material and the color filter layer to sense channels of the touch sensing circuitry during the first time period;
    wherein operating the first group in the first display operation occurs concurrently with operating the second group in the first touch sensing operation.

2. The method of claim 1, further comprising: operating the first portion of the group as touch sensing circuitry in a second touch sensing operation during a second time period different from the first time period.

3. The method of claim 2, further comprising: operating a third portion of the group of circuit elements as display circuitry in a second display operation, wherein operating the third portion of the group in the second display operation occurs concurrently with operating the first group in the second touch sensing operation.

4. The method of claim 2, wherein the second touch sensing operation includes operating one or more additional portions of the groups of circuit elements as touch sensing circuitry concurrently with operating the first group.

5. The method of claim 1, wherein operating the second portion of the group of circuit elements as touch sensing circuitry in the first touch sensing operation includes providing at least one buffer region between the drive lines, the buffer region having common electrodes unconnected from the drive lines.

6. The method of claim 5, wherein the drive lines are disposed in sets of rows and the buffer region is disposed between a first and second set of the rows of drive lines.

7. The method of claim 1, wherein the first portion of the group of circuit elements includes a first row of the common electrodes, and operating the first portion of the group of circuit elements in the first display operation includes applying a first preset voltage to the first row of the common electrodes.

8. The method of claim 7, further comprising: applying a second preset voltage to a second row of the common electrodes, the second preset voltage being an opposite polarity of the first preset voltage.

9. The method of claim 1, wherein the second portion of the group of circuit elements includes a plurality of rows of common electrodes.

10. The method of claim 9, wherein the plurality of rows of common electrodes are electrically connected through fixed conductive connections.

* * * * *

UNITED STATES PATENT AND TRADEMARK OFFICE
CERTIFICATE OF CORRECTION

PATENT NO.        : 8,804,056 B2                                    Page 1 of 1
APPLICATION NO.   : 12/976997
DATED             : August 12, 2014
INVENTOR(S)       : Shih Chang Chang et al.

It is certified that error appears in the above-identified patent and that said Letters Patent is hereby corrected as shown below:

In the Claims:

Column 13, claim 1, line 34, delete "A method of operating an touch screen including a" and insert -- A method of operating a touch screen including a --.

Column 14, claim 1, line 7, delete "the first group" and insert -- the first portion of the group --.

Column 14, claim 1, line 8, after "second", insert -- portion of the --.

Signed and Sealed this
Thirtieth Day of December, 2014

Michelle K. Lee
*Deputy Director of the United States Patent and Trademark Office*